Aug. 22, 1933.   H. J. HOENES   1,923,728
MACHINE FOR ENGRAVING TIRE MOLDS
Filed Feb. 21, 1928   16 Sheets-Sheet 5
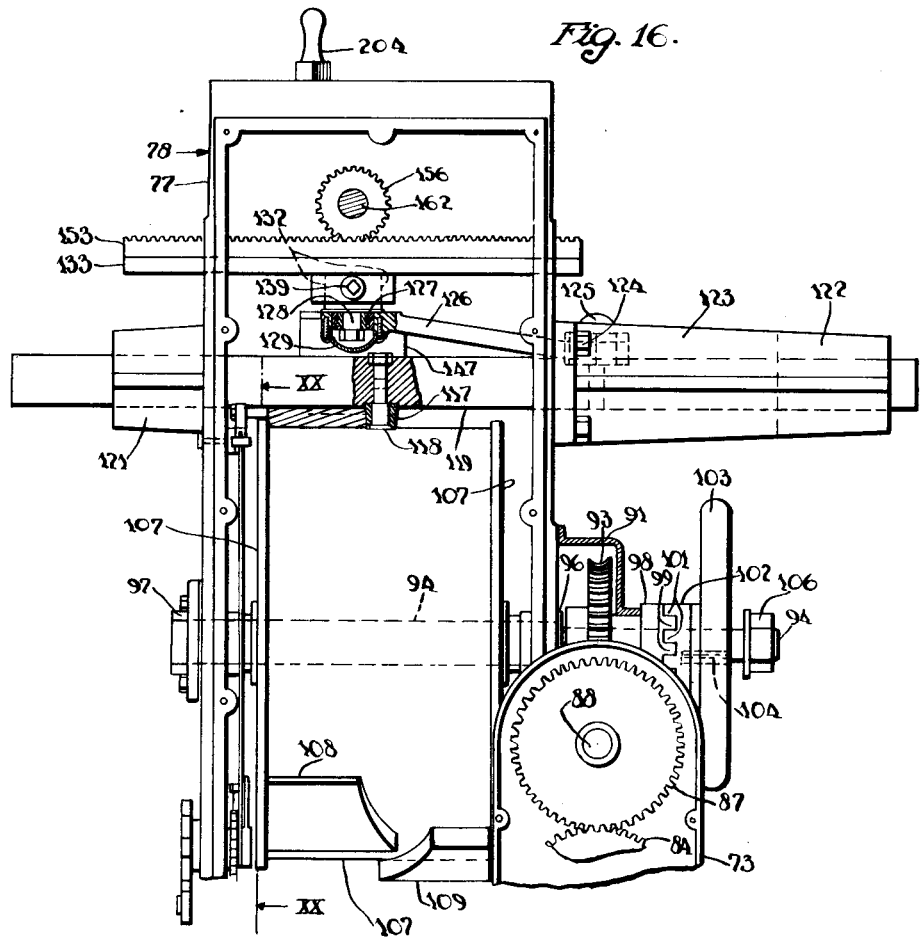
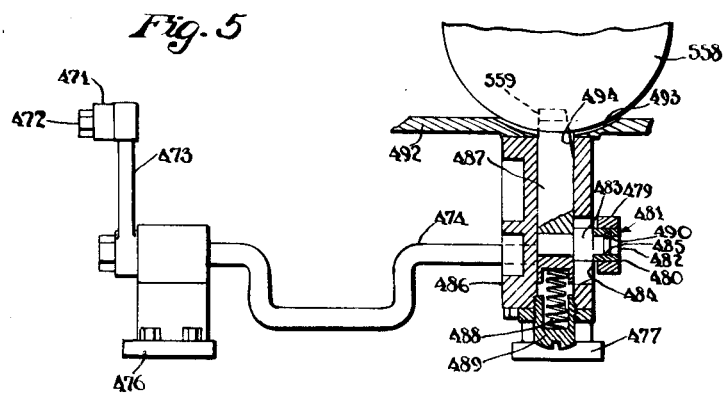
INVENTOR
Herman J. Hoenes.
BY
ATTORNEY Aug. 22, 1933.   H. J. HOENES   1,923,728
MACHINE FOR ENGRAVING TIRE MOLDS
Filed Feb. 21, 1928   16 Sheets-Sheet 6

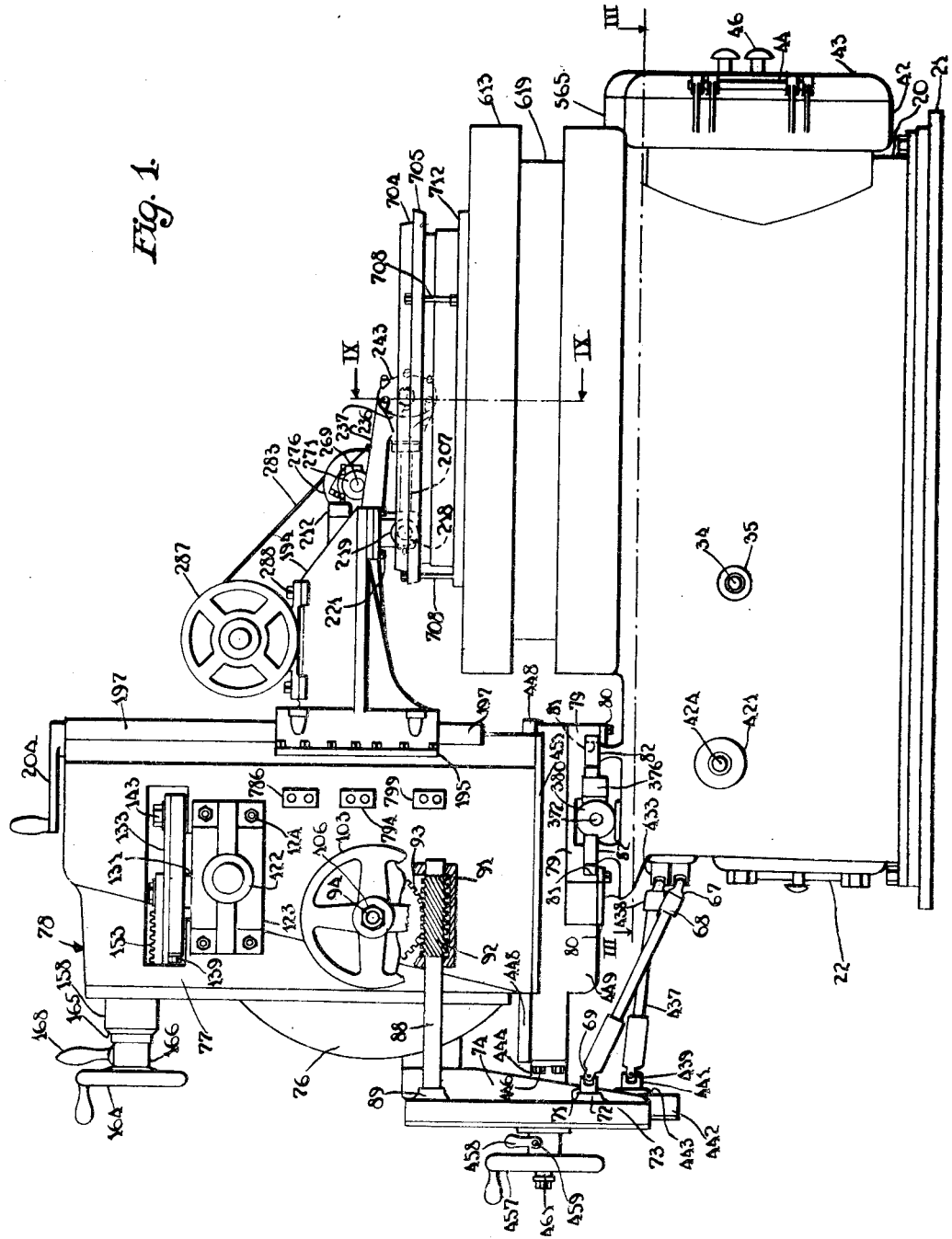

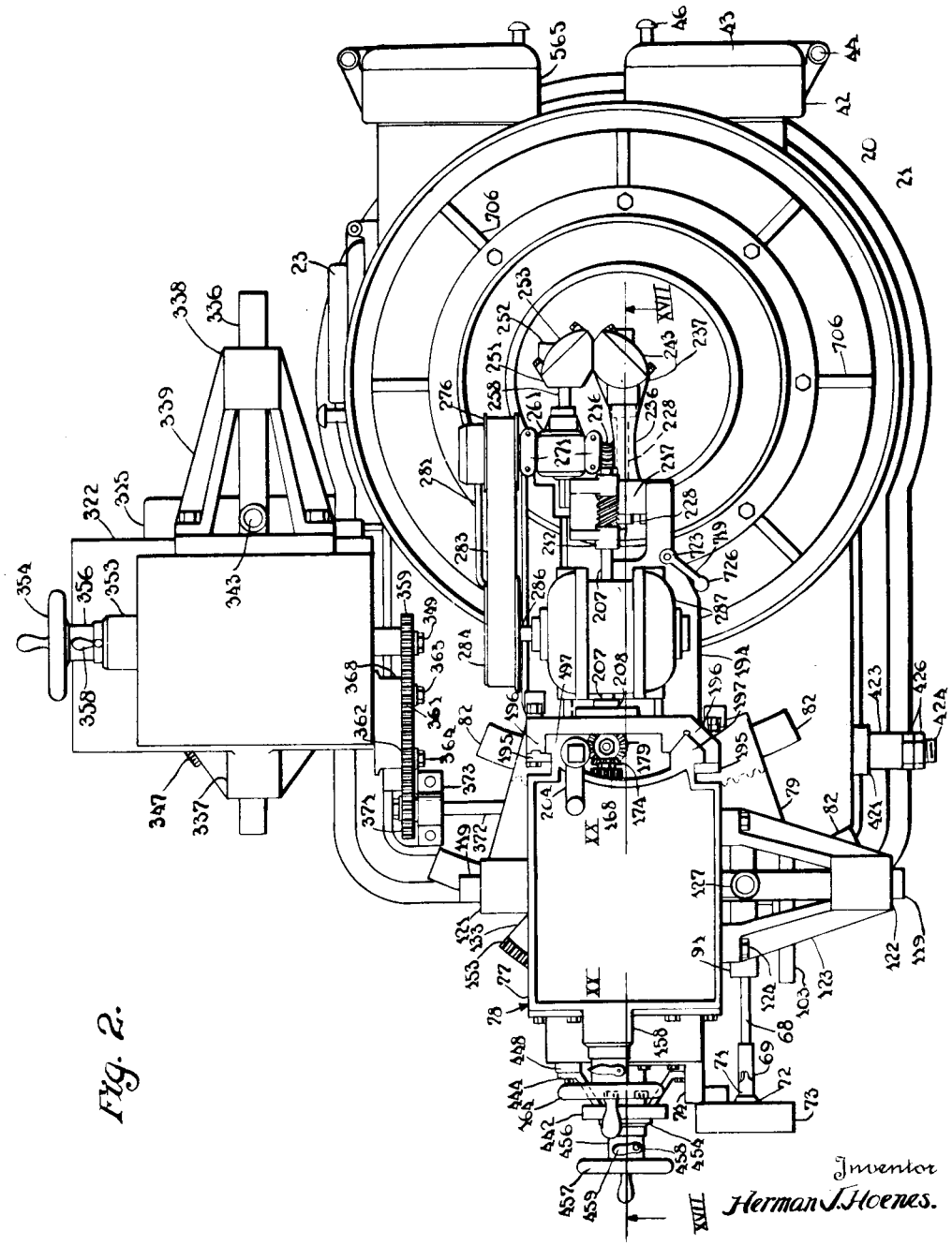

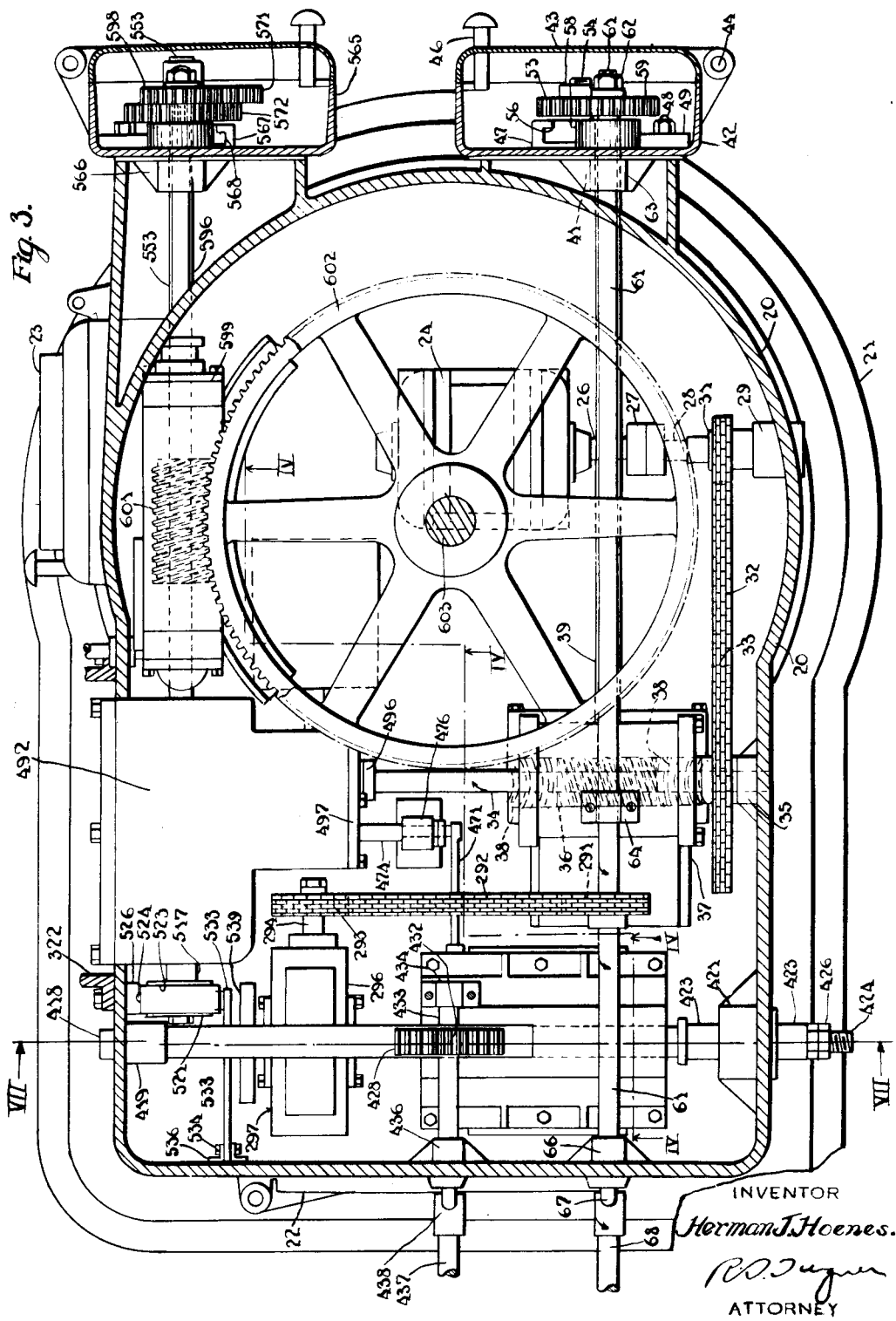

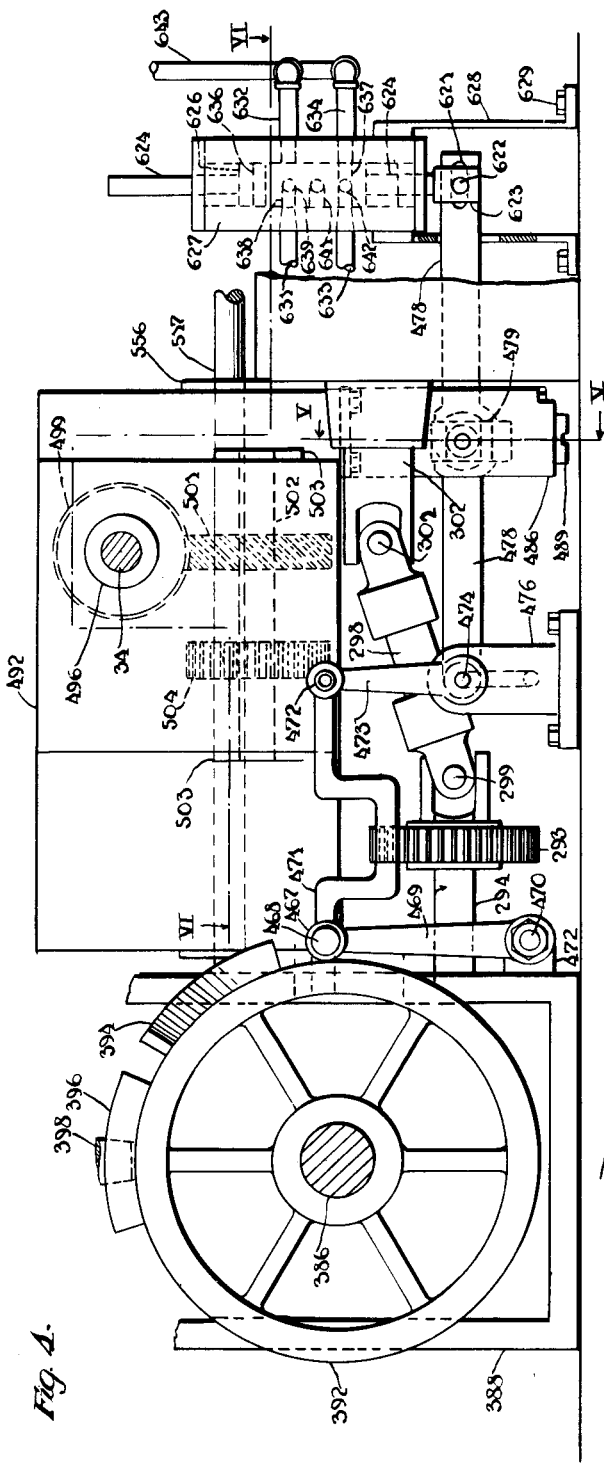

INVENTOR
Herman J. Hoenes.
BY
ATTORNEY

Aug. 22, 1933.    H. J. HOENES    1,923,728
MACHINE FOR ENGRAVING TIRE MOLDS
Filed Feb. 21, 1928    16 Sheets-Sheet 8

INVENTOR
Herman J. Hoenes.
BY
ATTORNEY

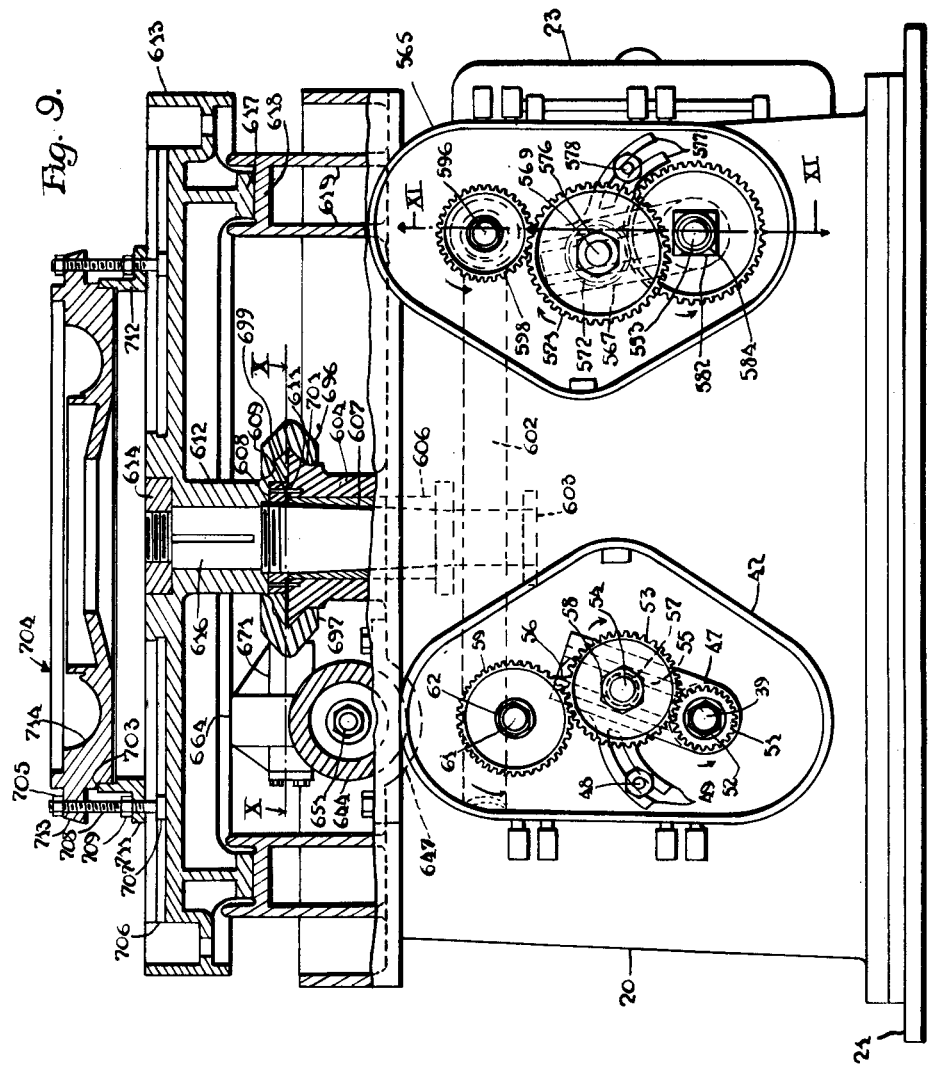

Aug. 22. 1933.　　　　H. J. HOENES　　　　1,923,728
MACHINE FOR ENGRAVING TIRE MOLDS
Filed Feb. 21, 1928　　16 Sheets-Sheet 10
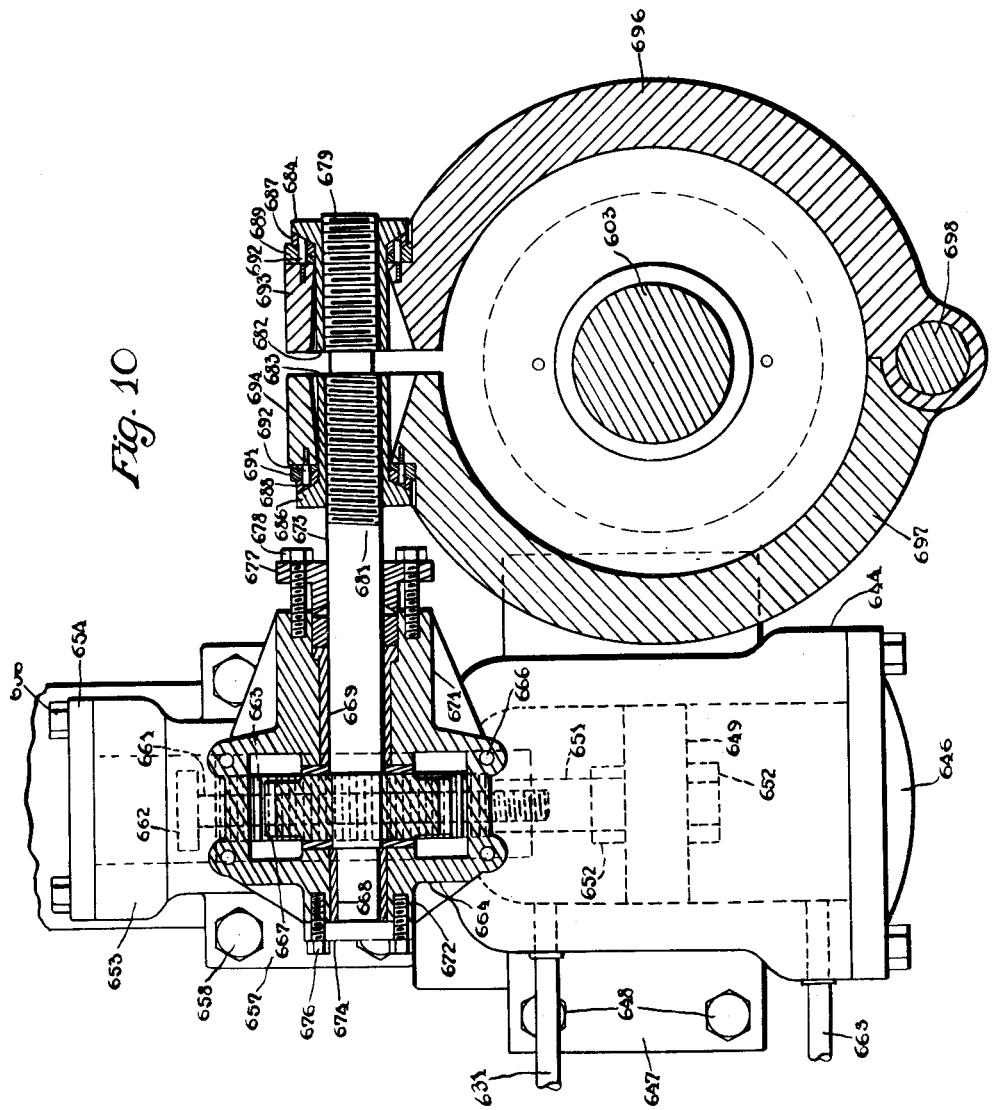
INVENTOR
Herman J. Hoenes.
BY
ATTORNEY Aug. 22, 1933.  H. J. HOENES  1,923,728
MACHINE FOR ENGRAVING TIRE MOLDS
Filed Feb. 21, 1928  16 Sheets-Sheet 11
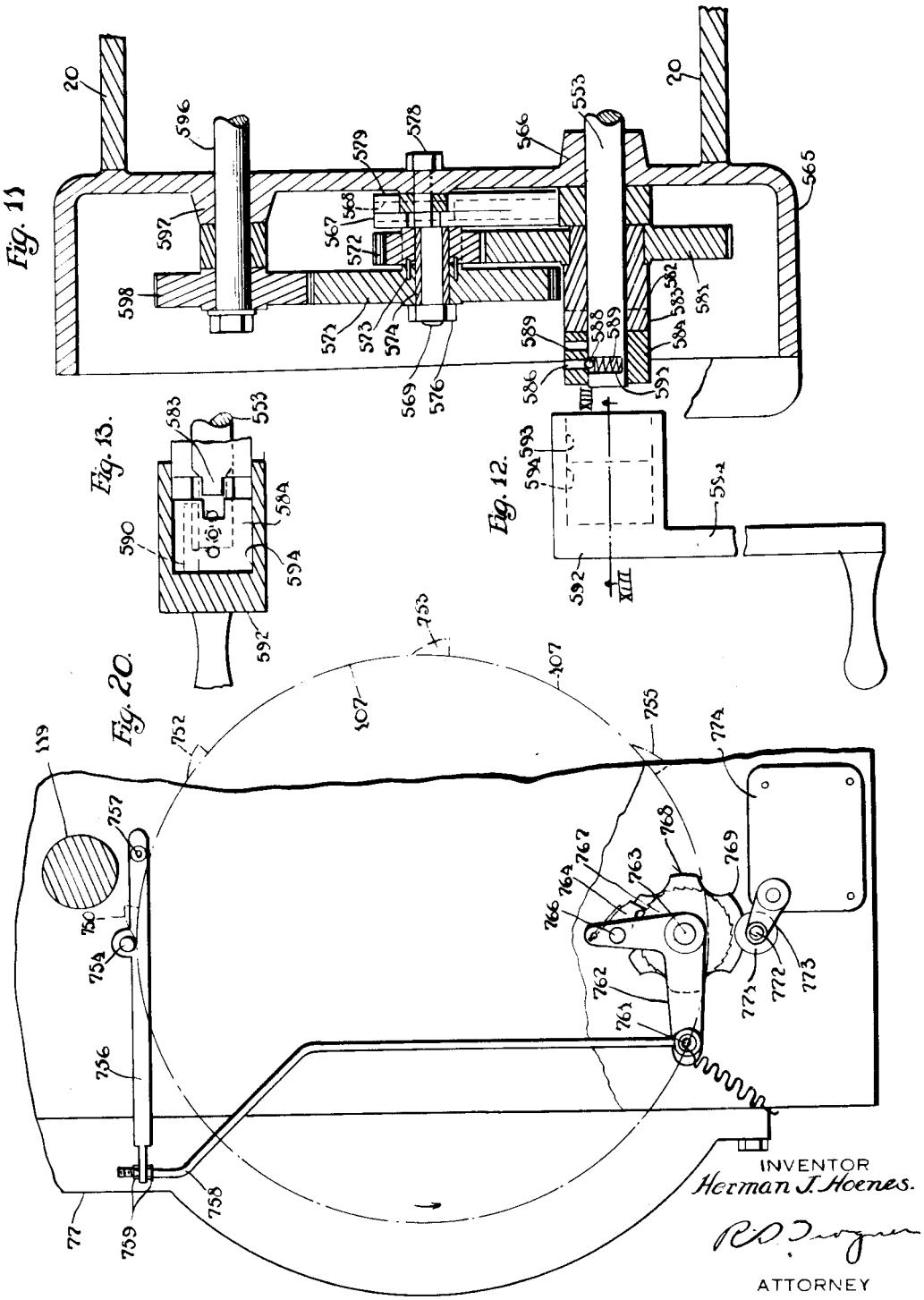
INVENTOR
Herman J. Hoenes.
ATTORNEY

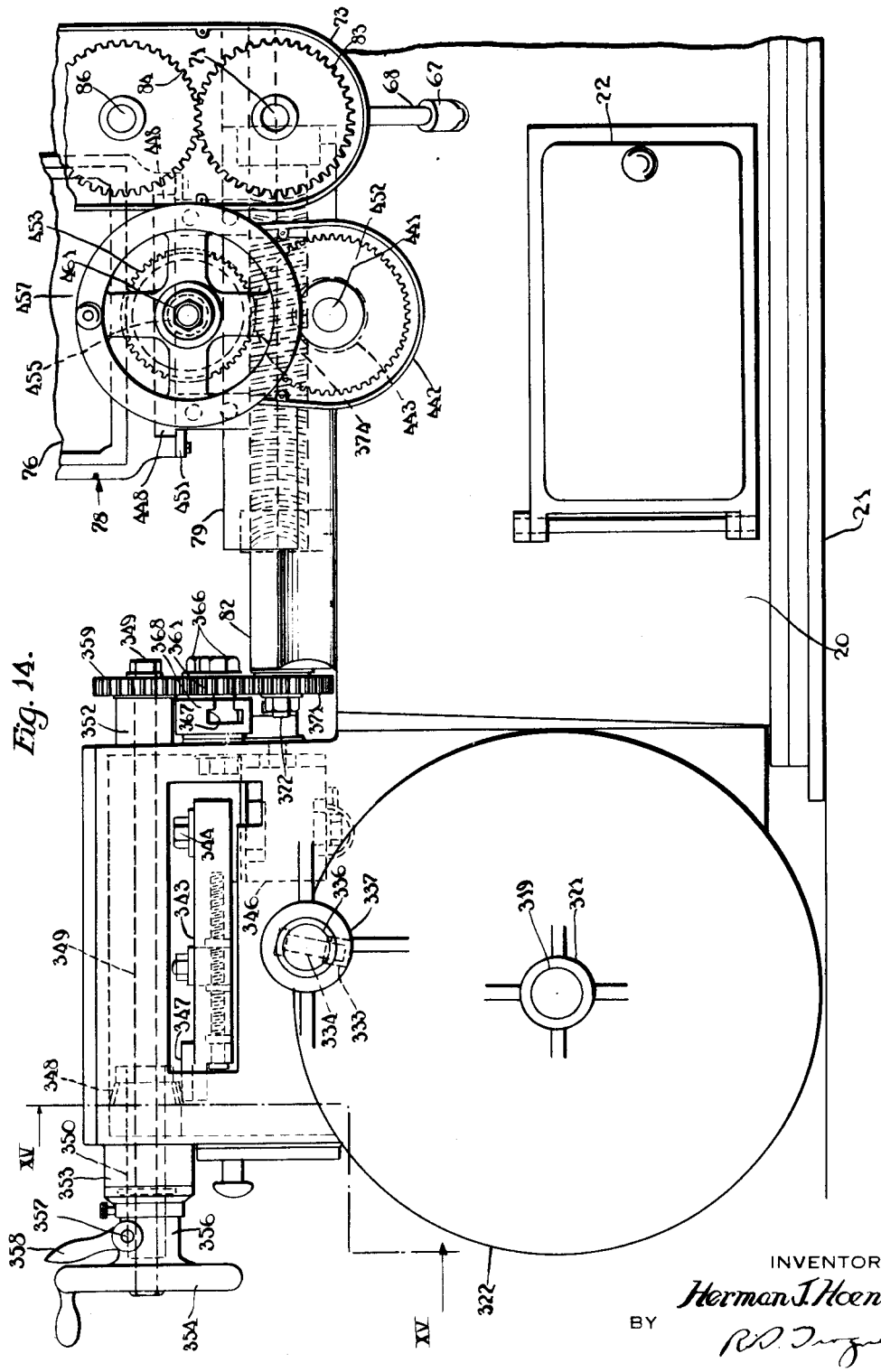

Aug. 22, 1933. H. J. HOENES 1,923,728
MACHINE FOR ENGRAVING TIRE MOLDS
Filed Feb. 21, 1928 16 Sheets-Sheet 13
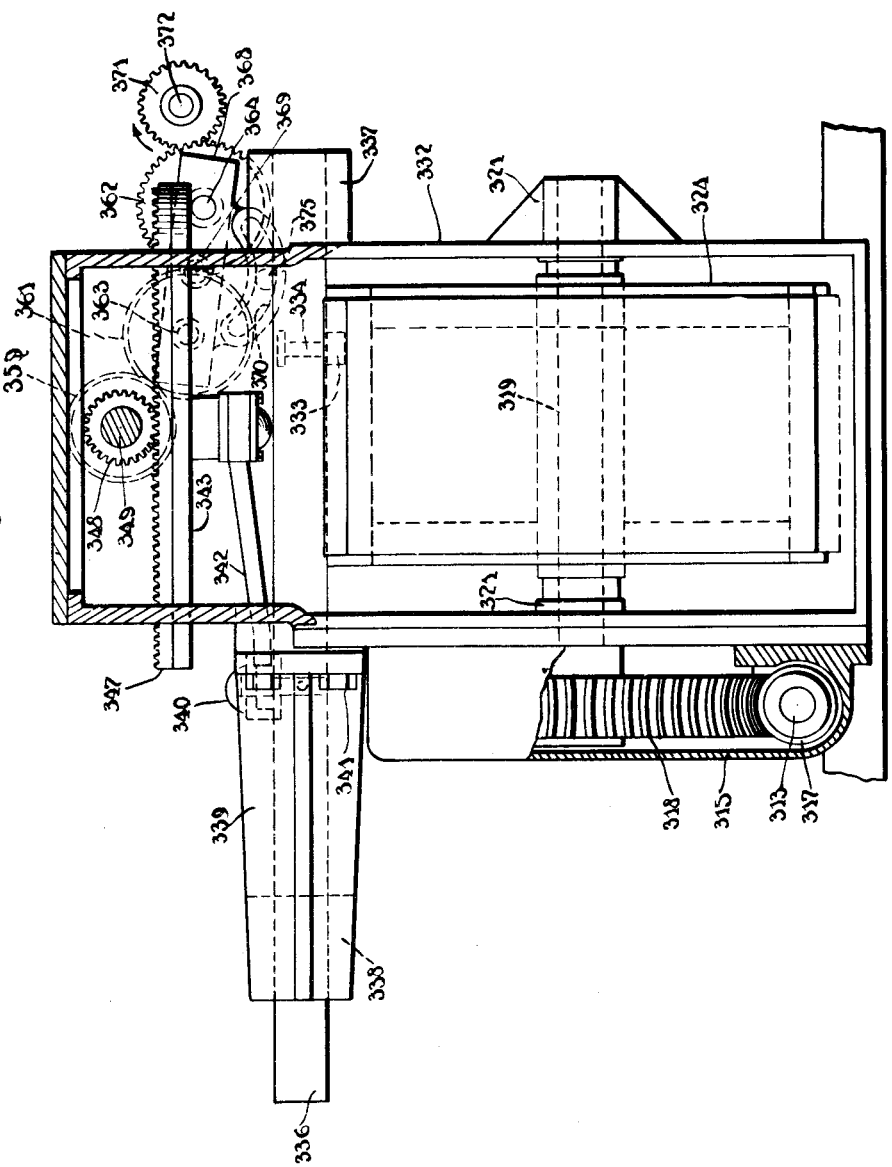
INVENTOR
Herman J. Hoenes.
BY
ATTORNEY Aug. 22, 1933.     H. J. HOENES     1,923,728
MACHINE FOR ENGRAVING TIRE MOLDS
Filed Feb. 21, 1928     16 Sheets-Sheet 14

INVENTOR
Herman J. Hoenes.
BY
ATTORNEY

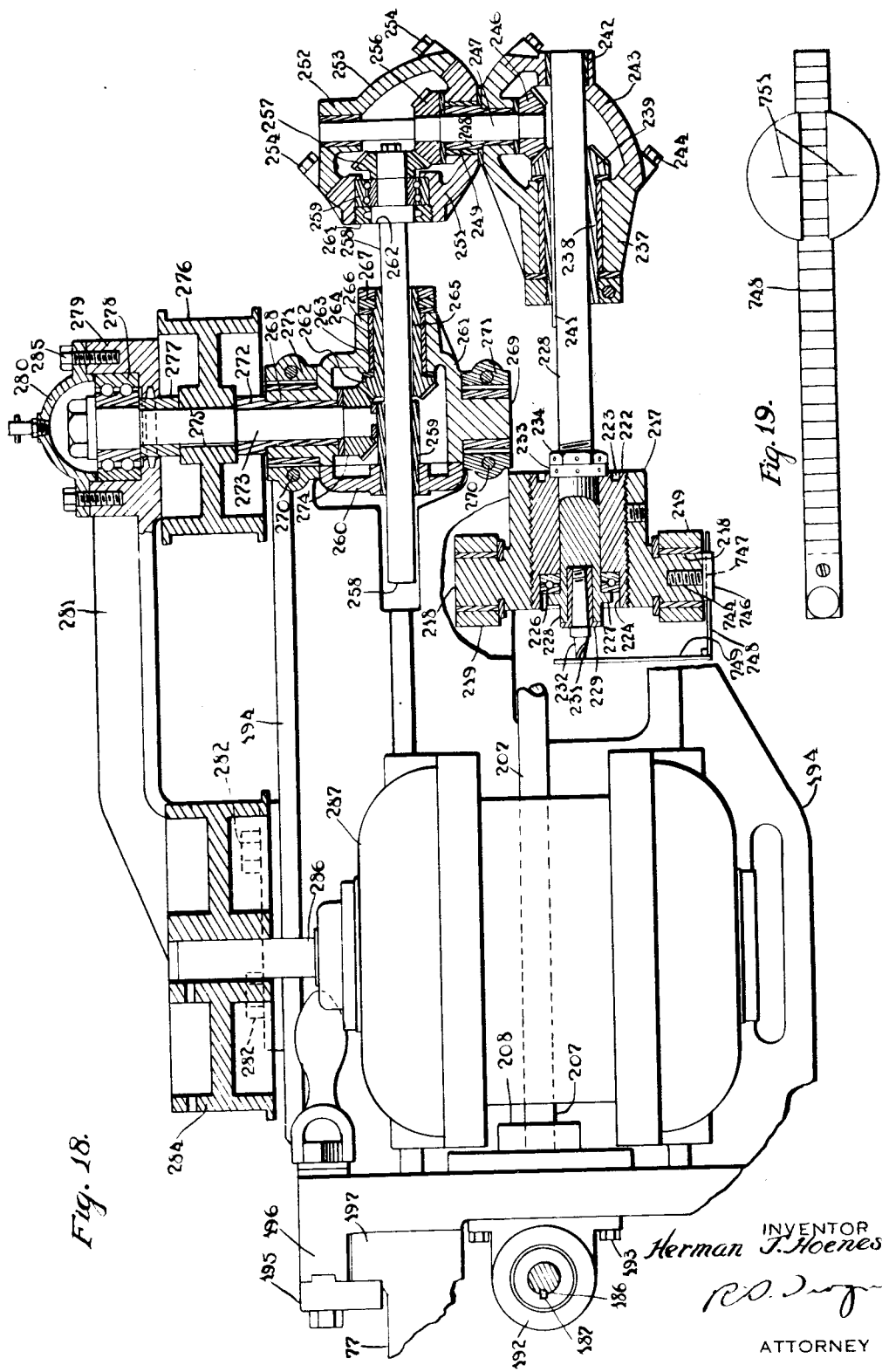

Aug. 22, 1933.    H. J. HOENES    1,923,728
MACHINE FOR ENGRAVING TIRE MOLDS
Filed Feb. 21, 1928    16 Sheets-Sheet 16

INVENTOR
Herman J. Hoenes.
BY
ATTORNEY

Patented Aug. 22, 1933

1,923,728

UNITED STATES PATENT OFFICE 1,923,728

MACHINE FOR ENGRAVING TIRE MOLDS

Herman J. Hoenes, Akron, Ohio, assignor to The Goodyear Tire & Rubber Company, Akron, Ohio, a Corporation of Ohio Application February 21, 1928. Serial No. 255,937

10 Claims. (Cl. 90—13.7)

The invention relates to engraving machines and has particular relation to a machine of the above designated character which shall be especially applicable for engraving molds for curing pneumatic tire casings.

One object of the invention is to provide a relatively economical machine for engraving molds which is capable of operating automatically and with a minimum amount of attention.

Another object of the invention is to provide a machine for engraving, in the surface of a mold, a series of characters composing a design, in which the relative position and dimensions of the respective characters are more perfect than has been realized in molds engraved by machines heretofore employed.

Another object of the invention is to provide a machine for engraving a continuous series of characters in the surface of a mold without the necessity for manual operation and adjustment of the machine upon the reproduction of each character of the series.

Another object of the invention is to provide a machine in which the characters composing a design are engraved while the mold is secured rigidly against rotation or other movement.

Prior to this invention, molds for pneumatic tire casings have been engraved by machines that were operated manually to a large extent, and for which relatively skilled and expensive operators were required. Even when extreme care was exercised in engraving a mold upon such a machine, the design often was relatively imperfect, owing to the accumulation of errors occurring in the individual characters of the design. It was necessary, periodically, to make inspections and measurements of the engraved surface in order that corrections might be made for cumulative errors which were greater than the possible tolerance at that portion of the mold. Owing to the extreme care, and the multiplicity of manual operations required, the engraving of molds by such machines obviously was relatively expensive.

This embodiment of the invention comprises a machine having a rotatable table upon which a mold is securely fastened. A tool mounted in a head, which traverses the surface of the mold, engraves each character of a design, while the table is secured rigidly against rotation. The movement of the head is controlled by a pair of cams, each adapted to move the head in a direction substantially at right angles to the direction it is moved by the other. The contours of the cams correspond to the respective coordinates of any character which it is desired to engrave. Another cam periodically controlling the movement of the head withdraws the tool from engagement with the mold after which the table is rotated, by a differential mechanism a distance equal to the distance between corresponding portions of each successive character. Thereafter, the last mentioned cam again actuates the head and the tool operatively engages an adjacent portion of the surface of the mold. The aforesaid operations are repeated automatically until a complete circumferential section of the mold is engraved.

For a better understanding of the invention, reference may now be had to the accompanying drawings, forming a part of this specification, in which:

Fig. 1 is a side elevational view of a machine illustrating one embodiment of the invention;

Fig. 2 is a plan view of the embodiment of the invention illustrated in Fig. 1;

Fig. 3 is a cross-sectional view of the machine taken substantially along the line III—III of Fig. 1;

Fig. 4 is a fragmentary view of the machine partly in cross-section and partly in elevation taken substantially along the line IV—IV of Fig. 3;

Fig. 5 is a fragmentary view, partly in elevation and partly in cross-section taken substantially along the line V—V of Fig. 4;

Fig. 9 is an end elevational view of the machine illustrating a portion thereof in cross-section taken substantially along the line IX—IX of Fig. 1;

Fig. 10 is a fragmentary view partly in plan and partly in cross-section taken substantially along the line X—X of Fig. 9;

Fig. 11 is a cross-sectional view of a portion of the machine taken substantially along the line XI—XI of Fig. 9;

Fig. 12 is an elevational view of a crank which is employed in connection with the operation of the machine;

Fig. 13 is a cross-sectional view of the crank taken substantially along the line XIII—XIII of Fig. 12, a portion of the mechanism shown by Fig.

11 being shown operatively positioned therein;

Fig. 14 is a fragmentary end elevational view of the apparatus opposite that illustrated by Fig. 9;

Fig. 15 is a view, partly in elevation and partly in cross-section, of an end of the portion of the machine illustrated by Fig. 14, the cross-sectional portion illustrated by the figure being taken substantially along the line XV—XV of Fig. 14;

Fig. 16 is an elevational view illustrating the remaining portion of the end of the machine illustrated by Fig. 14. In this view, a front plate of the housing is removed and portions of the mechanism are illustrated in cross-section.

Figure 21:
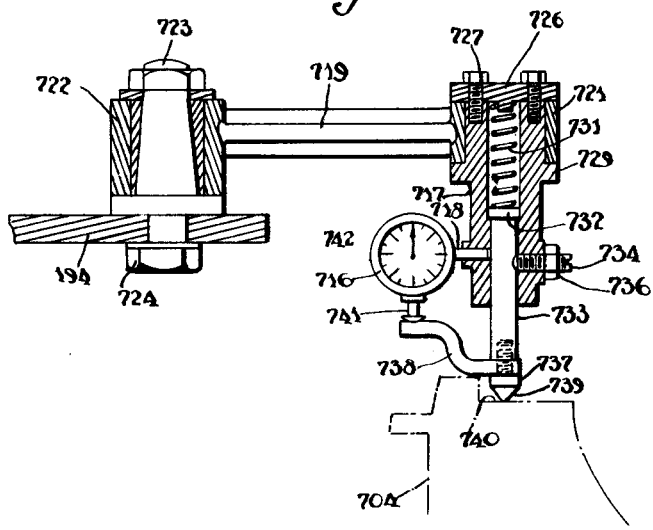
Figure 17:
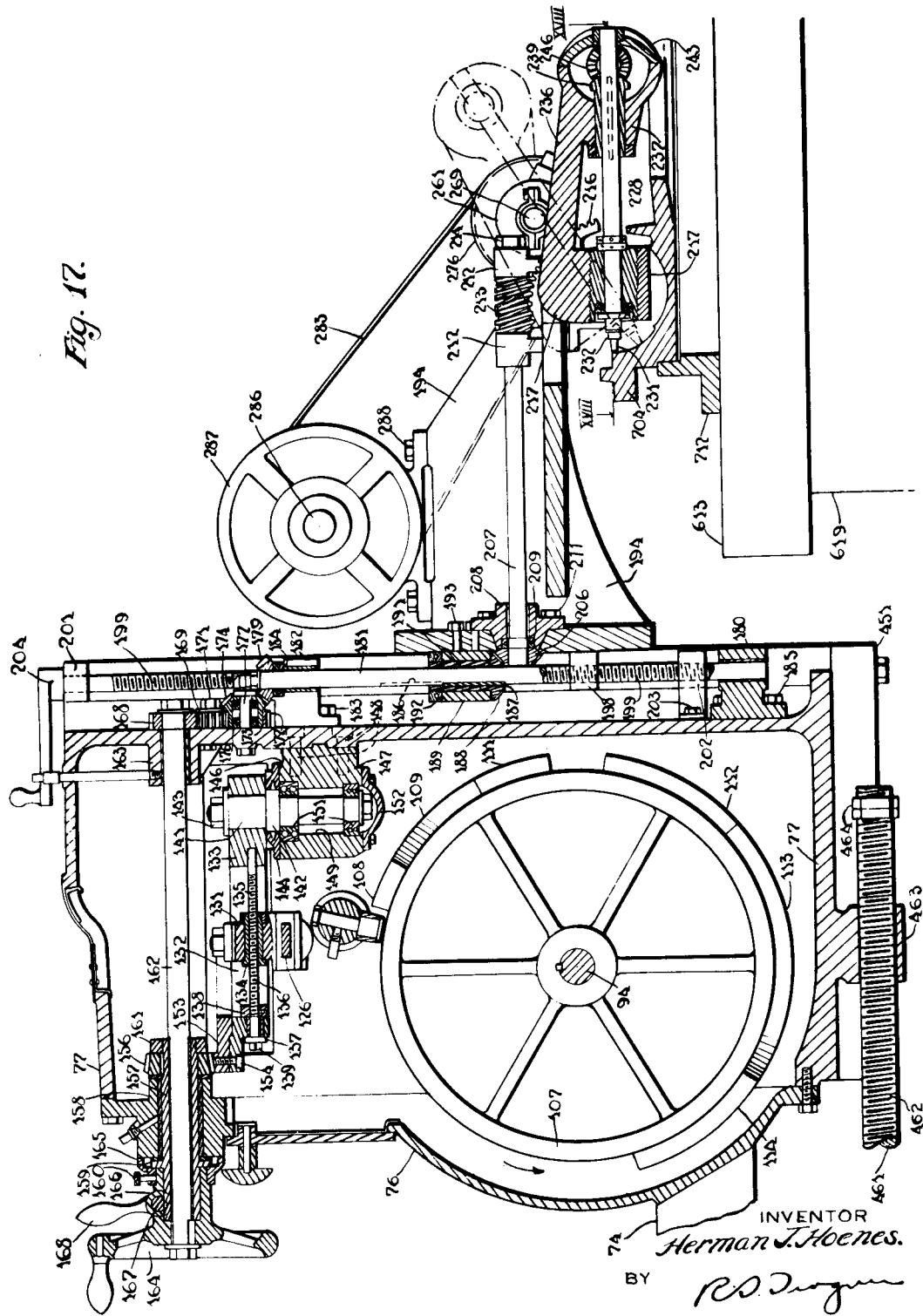
Figure 23:
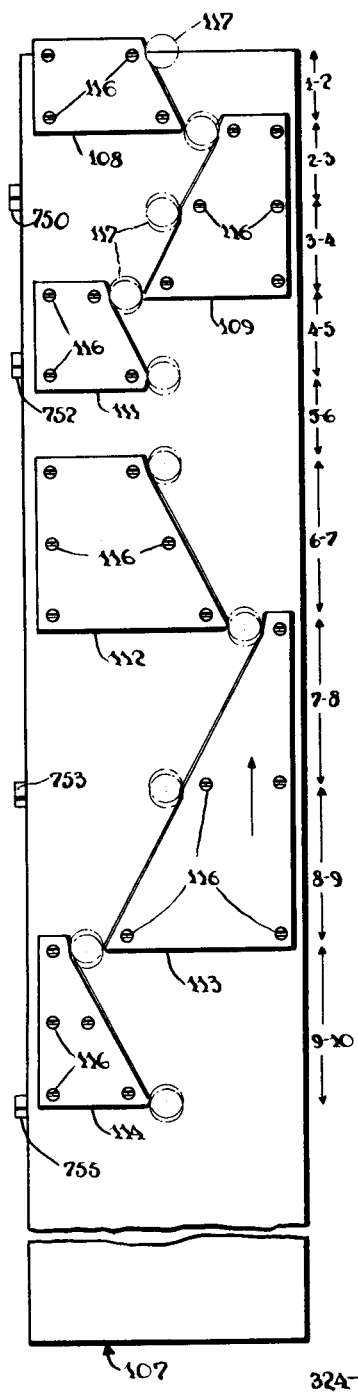
Figure 24:
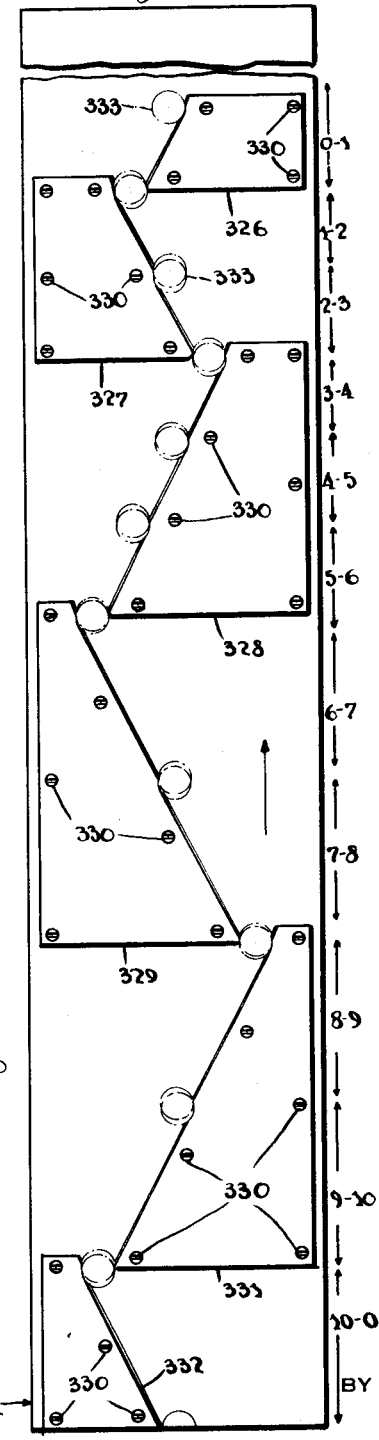
Figure 25:
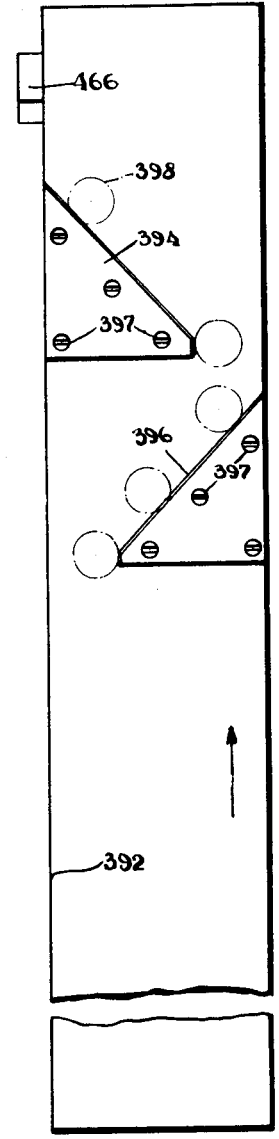

Fig. 17 is a cross-sectional view of a portion of the apparatus taken substantially along the line XVII—XVII of Fig. 2;

Fig. 18 is a plan view of a portion of the apparatus illustrated in Fig. 17, including a cross-sectional view taken substantially along the line XVIII—XVIII of Fig. 17;

Fig. 19 is a side elevational view of a measuring instrument illustrated in operative position in Fig. 18;

Fig. 20 is a fragmentary cross-sectional view of the mechanism illustrated in Fig. 16 taken substantially along the line XX—XX thereof;

Fig. 21 is a fragmentary cross-sectional view illustrating an instrument employed in connection with the operation of the machine;

Fig. 22 is a diagrammatical illustration of the electrical apparatus employed by the machine;

Fig. 23 is a view illustrating the development, into a plane, of the cam which controls the movement of the engraving tool in a vertical plane intersecting a mold radially;

Fig. 24 is a view illustrating the development, into a plane, of the cam for controlling the movement of the engraving tool in a plane substantially parallel with the mold;

Fig. 25 is a view illustrating the development, into a plane, of the cam controlling the operation of the index and other mechanism of the machine; and Fig. 26 is a diagrammatical view of a character of diamond shape, illustrating the movements of an engraving tool while the character is being engraved by the machine.

In practicing the invention, a frame or housing 20, supported by a base plate 21, is employed for enclosing a portion of the machine and for supporting the mold and the engraving mechanism thereon. Doors 22 and 23 (Figs. 1 and 2) provide access to the central portion of the housing 20. A motor 24 (Fig. 3) rigidly secured upon the base plate 21, within the housing 20, is provided with a driving shaft 26, secured by a coupling 27, to the end of a shaft 28, the opposite end of which is journaled in a bearing 29 formed in a side portion of the housing 20. A sprocket wheel 31, rigidly mounted on the shaft 28, drives a sprocket chain 32, which in turn drives a relatively large sprocket wheel 33 rigidly mounted on a shaft 34. A bearing 35, formed in an adjacent portion of the frame 20, rotatably supports one end of the shaft 34. A worm 36, located within the casing of a worm reduction gear 37, is rigidly mounted on the shaft 34 adjacent the sprocket wheel 33, the shaft 34 being journaled in the casing of the gear 37 at opposite ends of the worm. The worm 36 meshes with a worm wheel 38, mounted on the end of a shaft 39 extending through the gear casing and journaled in bearings formed therein. The opposite end of the shaft 39 extends through the housing 20, and is journaled in a bearing 41 formed in the rear wall of a gear box 42. A door 43, hinged to the box, as indicated at 44, is adapted to be secured in a closed position, by a latch 46.

A bracket 47 (Figs. 3 and 9), loosely mounted upon the end of the shaft 39, is adapted to be adjustably secured to the rear wall of the box 42 by a stud bolt 48, extending between a pair of spaced segments 49 formed on one side of the bracket 47. A gear wheel 51, rigidly secured by a nut 52, upon the end of the shaft 39 meshes with a gear wheel 53 rotatably mounted upon a sleeve 57, surrounding a pin 54, a head 55 of which is positioned within a slot 56 formed radially in the bracket 47. The sleeve 57, surrounding the pin 54, is clamped between the bracket 47 and a nut 58 that is screw threaded upon the end of the pin 54.

Since the length of the sleeve 57 is greater than the width of the gear 53, the latter rotates freely thereon. The distance between the centers of the pin 54 and the shaft 39 may be varied by loosening the nut 58, thereby permitting the pin 54 to slide freely in the slot 56.

The gear 53 meshes with a gear 59, rigidly secured by a nut 62, upon the end of a shaft 61. The ratio between the speeds of the shafts 39 and 61 obviously may be changed by substituting gears of different diameters on the shafts 39 and 61 and the pin 54, then so manipulating the pin 54 and the bracket 47 that the gears will mesh.

The end of the shaft 61, supporting the gear 59, is rotatably mounted in a bearing 63, formed in the rear wall of the box 42 above the bearing 41. An intermediate portion of the shaft 61 is rotatably mounted in a bearing 64 formed in an upper portion of the casing of the reduction gear 37, while the opposite end of the shaft is journaled in a bearing 66 formed in the opposite end of the housing 20. A universal joint 67 connects the end of the shaft 61, to an extensible shaft 68, which in turn is connected by a universal joint 69 (Figs. 1 and 14) to a short shaft 71. A bearing 72 formed in the rear wall of a gear housing 73 rotatably supports the shaft 71.

The housing 73 is supported by a bracket 74 rigidly secured to a plate 76 bolted to a housing 77 of a tool carriage 78. Guideways 81, formed in the lower surface of an arcuate plate 79, supporting the carriage 78, slidably receive a spaced pair of arcuate rails 82 extending vertically from an upper portion of the housing 20. Arcuate bars 80, secured to the lower edges of the plate 79, slidably engage lower edge portions of the rails 82 and thus prevent dislocation of the plate 79 therefrom.

A gear wheel 83 (Fig. 14) rigidly mounted on the end of the shaft 71, within the housing 73, meshes with a gear 84, which is rotatably mounted on the end of a pin 86 rigidly secured in the housing 73. The gear 84 in turn meshes with a gear 87 (Fig. 16) rigidly mounted on the end of a shaft 88 (Figs. 1 and 16) journaled adjacent the gear in a bearing 89, formed in the housing 73, and, adjacent its opposite end, in a worm gear housing 91 secured to the housing 77 of the carriage 78. A worm 92, rigidly mounted on the shaft 88, within the housing 91, meshes with a worm 93 rotatably mounted on the end of a shaft 94 journaled in bearings 96 and 97 formed in the housing 77. The worm wheel 93 has an extending hub portion 98 provided with clutch teeth 99 formed thereon which are adapted operatively to engage similar clutch teeth 101 formed on a hub 102 of a hand wheel 103, keyed, as indicated at 104, on the end of the shaft 94. A nut 106, threaded upon the end of the shaft 94, prevents the possible dislocation of the hand wheel 103 from the shaft 94, when the teeth 99 and 101 are disengaged.

A drum 107, rigidly mounted upon the shaft 94, is provided with a plurality of cams (Fig. 23) 108, 109, 111, 112, 113 and 114, which are rigidly secured thereto by screws 116. The cams are so arranged upon the drum 107 as to cover a greater portion of the surface thereof, there being a substantial space however between the end cams 108 and 114.

A cam follower 117 (Figs. 16), for engaging the oppositely disposed edges of the cams 108, 109, 111, 112, 113 and 114, is rotatably mounted on the end of a pin 118 which is secured rigidly in an intermediate portion of a shaft 119, transversely to the axis thereof. A bearing 121 formed in one side of the housing 77 slidably supports one end of the shaft 119, while the opposite end thereof is supported similarly in a bearing 122 secured to the housing 77 by angularly disposed brackets 123, formed integrally with respect to the bearing 122, and bolted to the housing 77, as indicated at 124. When the drum 107 is rotated, the shaft 119 will be moved longitudinally within its bearings by the aforesaid cams successively engaging the follower 117.

One end of an arm 126, is mounted pivotally on a pin 125 secured to the shaft 119, while the opposite end thereof receives a ball bearing ring 127 in which the end of a vertically disposed pin 128 is journaled. A plate 129, secured to the end of the arm 126 below the pin 128 and the bearing ring 127, prevents the escape of lubricant therefrom. The pin 128 projects from the lower surface of a rectangular block 131, (Fig. 17) slidably mounted between parallel guides 132 formed radially in the central portion of a segment 133.

An internally threaded bushing 134, rigidly secured in an opening formed in the block 131 parallel to the guides 132, engages a threaded portion 135 intermediate the ends of a rod 136. Bearings formed in the segment 133 rotatably support the rod 136 adjacent its opposite ends. A shoulder 137, formed on the rod 136 and a ring 138, rigidly mounted thereon, engage oppositely disposed surface portions of the segment 133 and prevent movement of the rod longitudinally in its bearings. A square head 139 formed on the end of the rod 136 adjacent the shoulder 137 is adapted to be engaged by a suitable wrench for turning the rod. It is apparent that rotation of the rod 136 will cause movement of the block 131 radially with respect to the segment 133.

The segment 133 is secured rigidly, at its axis, upon the end of a pin 141, between a shoulder 142, formed integrally therewith, and a nut 143. A thrust ring 144, surrounding the shoulder 142, rotatably supports the segment and is seated upon an upper end portion 146 of a block 147. Stud bolts 148 secure the block to an adjacent portion of the housing 77. Beyond the shoulder 142 the pin 141 projects into a vertical opening 149, formed in the block 147, and is rotatably supported therein by ball bearings 151. A plate 152, secured to a lower portion of block 147, surrounding the opening 149, prevents the escape of grease therefrom.

A slightly beveled arcuate rack 153, secured by screws 154 to an outer portion of the segment 133, is adapted to mesh with a correspondingly beveled gear 156. The latter is keyed upon the end of a sleeve 157, rotatably journaled in a bearing 158, formed in the housing 77. A flange 159, formed on an intermediate portion of the sleeve 157, beyond the bearing 158, is maintained in engagement with the end of the latter, by a thrust ring 161, rigidly mounted on the end of the sleeve beyond the gear 156.

A shaft 162, extending through the sleeve 157, is rotatably journaled at one end in the opposite ends of the sleeve, and at the opposite end thereof in a bearing 163 formed in the housing 77. A hand wheel 164, keyed upon the end of the shaft 162 adjacent the sleeve 157, is provided with a hub 166 having an opening formed therein adapted to surround the end of the sleeve 157 and abut the shoulder 159. A pin 167 extending through an opening in the hub 166, is provided with a recess at one side thereof for receiving an adjacent portion of the sleeve 157. One end of the pin 167 is threaded for receiving an adjusting lever 168 which, when tightened against the hub, causes longitudinal movement of the pin 167, and thus prevents relative rotation between the hub 166, and the sleeve 157. A graduated dial 165, adjustably secured to the hub 166 by a screw 160, indicates the angular movement of the shaft 162.

When the shaft 119 alternately is moved in opposite directions, the arm 126 oscillates the segment 133 on the pin 141, and consequently the rack 153 rotates the gear 156 alternately in opposite directions. Inasmuch as the gear 156 is keyed upon the sleeve 157, it rotates the hand wheel 164 and the shaft 162, whenever the pin 167 is so adjusted as to form a rigid connection between the hub 166 and the sleeve 157. When the hub 166 is not rigidly secured upon the sleeve 157, by the pin 167, it is apparent that the shaft 162 may be rotated by manipulation of the hand wheel 164, independently of the gear 156 and the sleeve 157. The ratio between the longitudinal movement of the shaft 119 and the angular rotation of the shaft 162 in opposite directions is varied by the longitudinal adjustment of the block 131 upon the threaded rod 136.

A small gear 168, rigidly secured upon the end of the shaft 162 beyond the bearing 163, meshes with a small gear 169, rotatably mounted on a pin 171, that is rigidly secured in an adjacent portion of the housing 77. A small ring gear 172, meshing with the gear 169, is screw-threaded upon a hub portion 173 of a bevel gear 174. The latter gear is rotatably mounted on ball bearings 176 arranged about a pin 177 rigidly mounted in the housing 77. A bevel gear 179, meshing with the bevel gear 174, is rigidly mounted upon the end of a vertically disposed shaft 181, journaled adjacent its upper end in a bearing block 182 secured to the housing 77 by bolts 183. A thrust bearing 184 disposed in the block 182 provides a rotatable seat for supporting the gear 179. A bearing 180, rigidly secured to the housing 77 by bolts 185, rotatably supports the lower end of the shaft 181.

A relatively long key-way 186, formed in the shaft 181, receives slidably a key 187 rigidly mounted in a bevel gear 188 slidably engaging the shaft. A bearing 189, rotatably supporting a sleeve portion 191 of the gear 188, is rotatably engaged at opposite ends by the gear 188 and by a thrust ring 192 screw-threaded and locked upon the end of the sleeve 191 opposite the gear. Bolts 193 rigidly secure the bearing 189 to a frame 194 disposed horizontally with respect to the tool carriage 78. Guideways 196, formed on the frame 194, operatively engage vertically disposed rails 197 (Fig. 2) formed on the housing 77. Bars 195, secured to the frame 194 adjacent the guideways 196, prevent displacement of the rails 197 therein. Internally threaded bosses 198, extending from the frame 194, operatively engage a threaded rod 199 rotatably mounted at opposite ends in a bearing 201 formed in an upper portion of the housing and in a bearing 202, bolted to a lower portion of the housing 77, as indicated at 203. The upper end of the rod 199, extending beyond the bearing 201, is provided with a crank 204, rigidly mounted thereon, which is adapted to be rotated manually for raising or lowering the frame 194 with respect to the housing 77. When the frame 194 is moved with respect to the housing 77, the bevel gear 188 slides upon the rod 181.

A bevel gear 206, meshing with the bevel gear 188, is rigidly mounted upon the end of a shaft 207, which is rotatably mounted, adjacent the gear 206, in a bearing block 208 having a ball bearing 209 secured therein. The bearing block 208 is rigidly secured to the frame 194, by bolts 211. The opposite end of shaft 207 is journaled between a spaced pair of bearings 212 secured to the frame 194. A nut 214, threaded upon the end of the shaft, abuts one of the bearings and provides a thrust bearing for the shaft. A worm 213, keyed upon the shaft between the bearings 212, operatively engages a worm segment 216, which is rigidly secured upon a tool head 217 (Figs. 17 and 18) pivotally mounted on laterally disposed trunnions 218. Bearings 219, rotatably supporting the trunnions, are disposed concentrically with respect to the segment 216 and are bolted, as indicated at 221 (Fig. 1) to the lower surface of the frame 194.

A sleeve 222 (Figs. 17 and 18), screw-threaded into an opening intersecting the axis of the tool head 217, is provided with spaced circumferentially formed openings 223, adapted to receive a spanner wrench (not shown) for rotating the sleeve and consequently moving it longitudinally within the head 217. A recess 224, formed in the opposite end of the sleeve 222, receives a thrust bearing 226, which is abutted by a flange 227 formed adjacent an end of a tool spindle 228, which is journaled in the sleeve. A flanged sleeve 229, rigidly secured in an opening formed in this end of the spindle 228 has a tapered opening formed centrally thereof which receives a tapered shank 231 of an engraving tool 232. A threaded thrust ring 233, locked upon the spindle 228, by a nut 234, engages the end of the sleeve opposite the tool and thus permanently seats the shoulder 227 upon the bearing 226.

An arm 236 (Figs. 1 and 2) formed integrally with respect to the head 217, supports an integrally formed bearing block 237, rotatably supporting a sleeve portion 238, of a bevel gear 239, which is keyed, as indicated at 241, upon the end of the spindle 228. The end of the spindle 228 beyond the gear 239, is rotatably mounted in a bearing 242 formed in a plate 243 which is bolted, as indicated at 244, to the bearing block 237. The shaft 228 is slidable longitudinally within the gear 239 and the bearing 242, in order to accommodate the longitudinal adjustment of the sleeve 222.

A bevel gear 246, meshing with the bevel gear 239, is rigidly mounted on the end of a short shaft 247 rotatably journaled in a sleeve 248. One end of this sleeve is rigidly secured in the bearing block 237, while the opposite end thereof is journaled in a bushing 249 secured in an opening formed in a bearing block 251. The opposite end of the shaft 247 is journaled in a bearing 252, formed in a plate 253, which is bolted, as indicated at 254, to the block 251.

A bevel gear 256, rigidly mounted on the shaft 247 and abutting the end of the bushing 249, meshes with a bevel gear 257 rigidly mounted on the end of a shaft 258. A ball bearing 259, mounted in an opening in the block 251, rotatably supports the end of the shaft 258 adjacent the gear 257. A ring 261, threaded into the block 251 and surrounding a shoulder 262 formed on the shaft 258, prevents the escape of oil from within the block 251 and the plate 253. The opposite end of the shaft 258 is journaled in a bushing 259, that is secured in an opening formed in an end plate 260 of a gear housing 261. A bevel gear 262, keyed, as indicated at 265, upon the shaft 258, is provided with a sleeve 263, which is rotatably journaled in a bushing 264 secured in an opening in a boss 266 formed on one side of the housing 261. The gear 262 abuts one end of the boss 266 and is maintained in this position by a thrust ring 267 threaded upon the sleeve 263 at the opposite end of the boss. The gear housing 261 is provided with oppositely disposed trunnions 268 and 269 extending normally with respect to the shaft 258 which trunnions are journaled in bearings 271 secured by bolts 270 upon a portion of the frame 194. The trunnion 268 has an opening formed axially therein which is adapted to receive a flanged bushing 272 having a portion of a shaft 273 rotatably journaled therein. A bevel gear 274, secured on the end of the shaft 273 within the housing 261, meshes with the gear 262. A pulley 276, keyed upon the shaft 273, as indicated at 275, and abutting the flanged portion of the bushing 272, is maintained in position against the bushing by a collar 277 rigidly secured on the shaft 273 beyond the pulley. The end of the shaft 273, beyond the sleeve 277, is journaled in a ball bearing 278 mounted in a bearing block 279, which is supported by a bracket 281, bolted, as indicated at 282, to a portion of the frame 194. A plate 280, bolted, as indicated at 285, to the bearing block 279 opposite the end of the shaft 273, covers the end of the block 279. The pulley 276 is rotatably driven by a belt 283, which, in turn is driven by a pulley 284, keyed on the end of a shaft 286 of the motor 287. Bolts 288 rigidly secure the motor 287 to the frame 194.

The motor 287 rotates the tool spindle 228 continuously through the medium of the aforesaid belt, shafts and gears. Since the worm shaft 207 is connected to the shaft 162 by the shaft 131, the worm 213 is rotated in opposite directions in unison with the movement of the shaft 119. Consequently, the segment 216, driven by the worm 213, oscillates the head 217 on the trunnions 218 and the end of the tool 232 describes an arc of a circle in a vertical plane, the radius of which is determined by the position of the sleeve 222 within the head.

Figure 6:
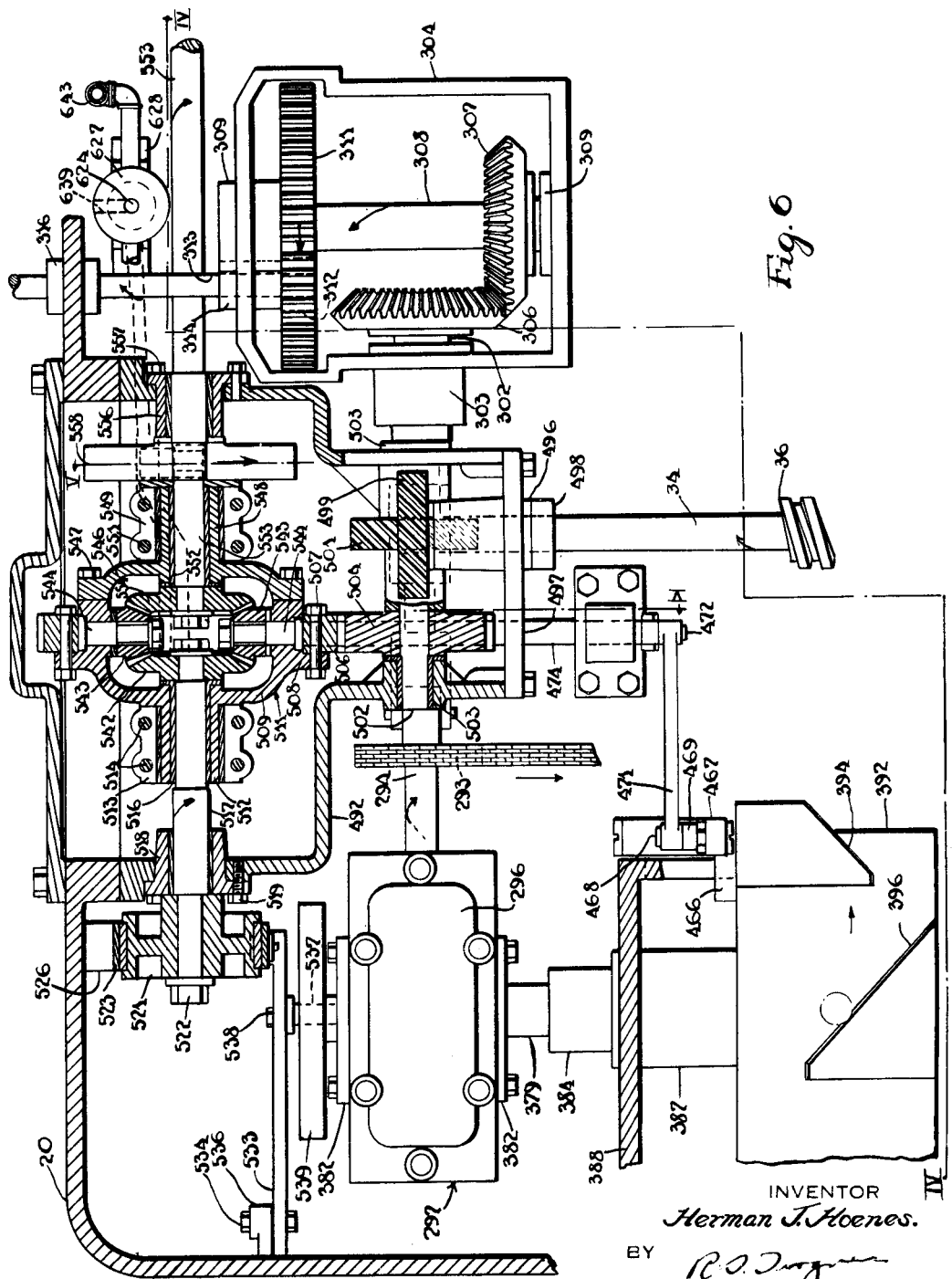
Fig. 6 is a fragmentary cross-sectional view of the machine taken substantially along the line VI—VI of Fig. 4.

A sprocket wheel 291 (Figs. 3, 4 and 6), rigidly mounted on the shaft 61, between the bearings 64 and 66, drives a sprocket chain 292 which in turn drives a sprocket wheel 293 rigidly mounted on a shaft 294 journaled in a casing 296 of a worm reduction gear 297. A shaft 298, having universal joints 299 and 301 at opposite ends thereof, connects the shaft 294 to a shaft 302, the latter being arranged in a horizontal plane slightly above the plane of the shaft 294. A journal bearing 303 (Fig. 6), formed on the side of a gear housing 304 secured to the base plate 21, rotatably supports the shaft 302. A bevel gear 306, rigidly mounted on the end of the shaft 302 beyond the bearing 303, meshes with a beveled gear 307 similarly mounted on the end of a shaft 308. Journal bearings 309, formed at opposite ends of the gear housing 304, rotatably support opposite ends of the shaft 308. A large spur gear 311, rigidly mounted on the shaft 308, at the end of the housing 304 opposite the gear 307, meshes with a pinion 312 which is rigidly mounted upon the end of a shaft 313. The latter shaft is journaled, at one end, in a bearing 314, formed in the housing 304, and adjacent the opposite end thereof in a bearing 316 formed in the housing 20.

A gear casing 315 (Figs. 2 and 15), secured on one side of a drum housing 322, which is in turn secured to the housing 20, rotatably supports the end of the shaft 313 beyond the bearing 316. A worm 317, mounted on the end of the shaft 313 within the casing 315, meshes with a worm wheel 318 rigidly mounted on the end of a shaft 319, which is journaled adjacent its opposite ends in bearings 321 formed in the drum housing 322. A plurality of cams 326, 327, 328, 329, 331 and 332 (Fig. 24), secured by screws 330, upon a greater portion of the circumferential surface of a drum 324, successively engage a cam follower 333 (Fig. 15) rotatably mounted upon a pin 334, that is rigidly secured transversely in a shaft 336.

A bearing 337, formed in one side of the housing 322, slidably supports one end of the shaft 336, while the opposite end thereof is similarly supported in a bearing 338 having obliquely disposed brackets 339 extending therefrom which are bolted to the side of the housing, as indicated at 341. One end of an arm 342 is pivotally secured to the shaft 336 by a pin 340, while the opposite end of the arm is pivotally secured to a segment 343. Since the segment 343 and its connection with the arm 342 is similar in every detail to the segment 133 and its adjustable connection to the arm 126, further description thereof is unnecessary.

A pin 344 (Fig. 14) mounted in a bearing block 346 rigidly secured to an adjacent portion of the housing 322, pivotally supports the segment 343. A rack 347, mounted upon the segment, meshes with a slightly beveled gear 348 rigidly mounted adjacent one end of a shaft 349 which is journaled at the opposite end of the housing 322 in a bearing 352 formed therein. The gear 348 is rigidly mounted on one end of a sleeve 350 (similar to the sleeve 157 illustrated in Fig. 17) which is journaled in a bearing 353 formed in the housing 322. The shaft 349 extends through and is journaled in the sleeve 350. A hand wheel 354 having a hub 356 surrounding the sleeve is rigidly mounted on the end of the shaft. A pin 357, extending through a portion of the hub 356, is provided with a hand lever 358 for tightening the hub upon the sleeve 350 as hereinbefore described.

A gear 359, rigidly mounted on the end of the shaft 349, meshes with the first of a pair of gears 361 and 362 (Figs. 14 and 15) rotatably mounted upon pins 363 and 364 adjustably secured by nuts 366 in a slot 367 formed in a bracket 368 secured to the housing 322 by a bolt 369. An arcuate slot 370, having its center of curvature on the axis of the bolt 369, receives a bolt 375 for adjustably securing the bracket to the housing 322. The gear 362 meshes with a gear 371, rigidly mounted on the end of a shaft 372 (Fig. 1) that is journaled adjacent the gear 371 in a bearing 373 mounted on an upper portion of the frame of the housing 20.

A worm 374, mounted on the shaft 372, and partially surrounded by a casing 380 (Fig. 1) in which the shaft 372 is journaled, operatively engages a worm rack 376, rigidly secured to the guide plate 79. When the drum 324 is rotated, the cams 326, 327, 328, 329, 331 and 332 engage the follower 333 successively, thereby moving the shaft 336 alternately in opposite directions. Consequently, the segment 343 is oscillated, upon the pin 344 by the arm 342, thus rotating the shaft 349, the gear train 359, 361, 362, 371, the shaft 372 and the worm 374 alternately in opposite directions. The rack 374, engaged by the worm 376 thus moves the carriage 78 in opposite directions upon the arcuate rails 82.

A worm 377 (Fig. 7) situated in the casing 296 and rigidly secured to the end of the shaft 294, drives a worm wheel 378, which is rigidly mounted on a shaft 379, the latter being rotatably mounted in ball bearings 381 secured in the casing 296. End plates 382, provided with openings for the shaft 379, are bolted to the casing 296, as indicated at 383. A coupling 384 rigidly connects an end of the shaft 379 to the end of a shaft 386 which is journaled adjacent the opposite ends thereof in bearings 387 formed in spaced standards 388 and 389 bolted to the base plate 21, as indicated at 391. A drum 392, rigidly mounted on the shaft 386, is maintained in position between the bearings 387 by thrust bearings 393. A pair of cams 394 and 396 (Fig. 25) are secured on the outer surface of the drum 392 by screws 397.

Figure 7:
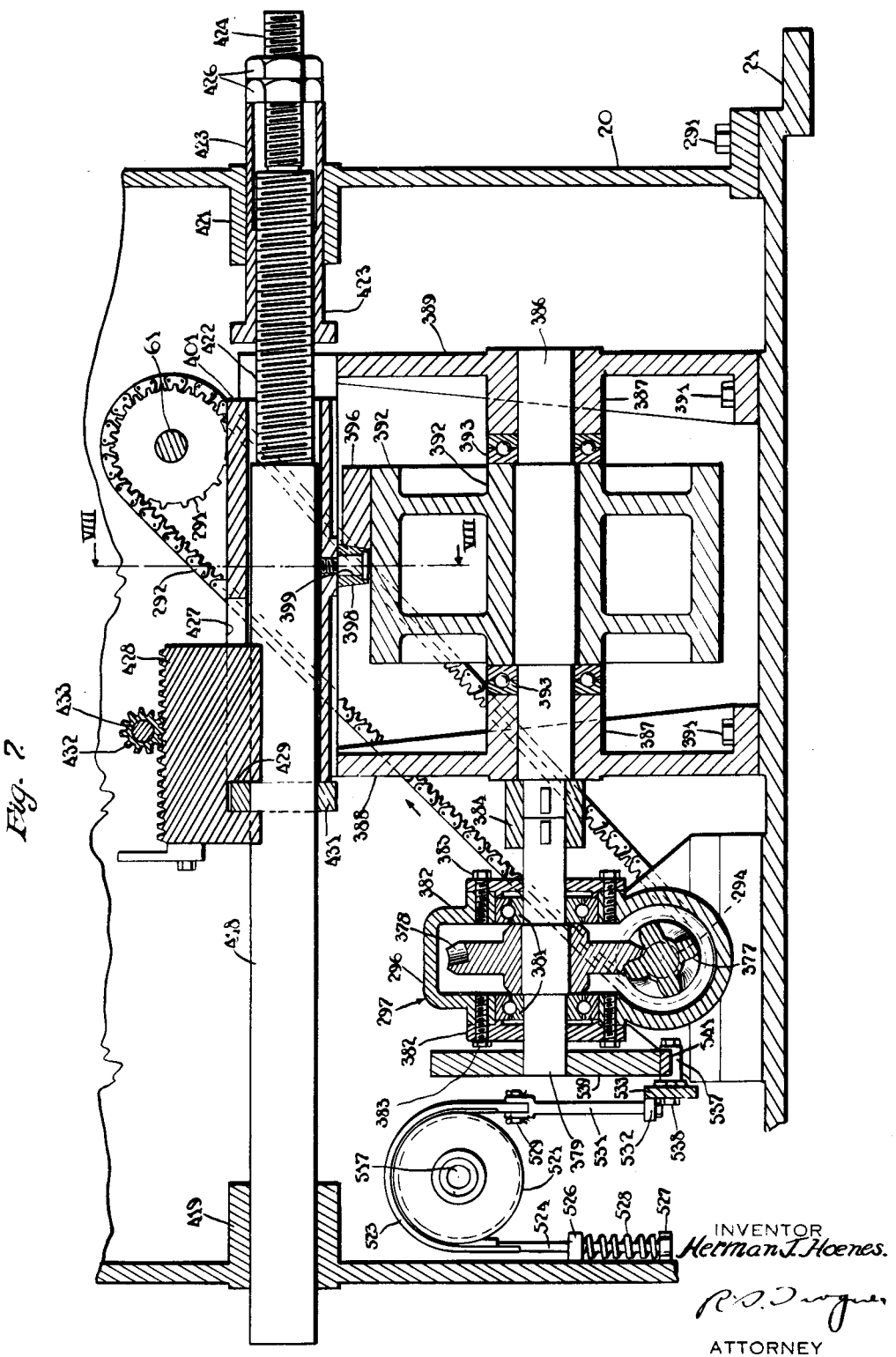
Fig. 7 is a fragmentary vertical cross-sectional view of the machine taken substantially along the line VII—VII of Fig. 3.
Figure 8:
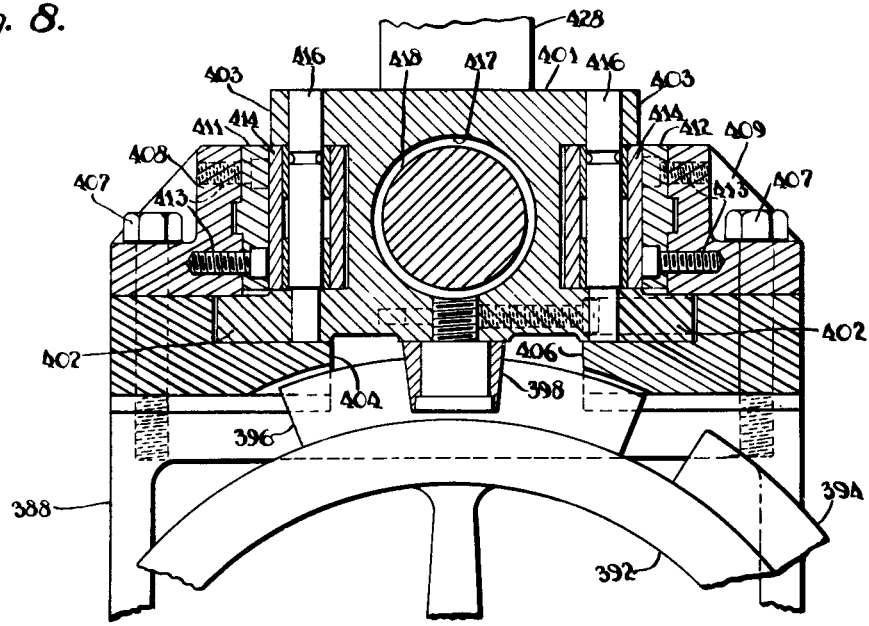
Fig. 8 is a vertical cross-sectional view of a portion of the machine taken substantially along the line VIII—VIII of Fig. 7.

A follower 398 (Fig. 7), adapted to engage the cams 394 and 396, is rotatably mounted upon a pin 399 rigidly mounted in a lower intermediate portion of an elongate block 401 (Figs. 7 and 8). Oppositely disposed flanges 402 formed longitudinally of the block 401 slidably engage horizontal guide-ways formed in spaced parallel rails 404 and 406. Angle bars 408 and 409, supported by the rails 404 and 406 and engaging the upper edges of the flanges 402, are secured adjacent the opposite ends thereof by bolts 407, extending through the rails 404 and 406, to the upper ends of the standards 388 and 389. Gib plates 411 and 412 are secured adjustably to the vertical surfaces of the bars 408 and 409 by screws 413. A plurality of rollers 414, engaging the outer surfaces of the gib plates 411 and 412, are rotatably mounted on pins 416 that extend between flanges 403 projecting laterally from an upper portion of the block 401 and the flanges 402.

A cylindrical opening 417 formed longitudinally in the block 401 receives, in spaced relation thereto, a shaft 418 slidably mounted adjacent its opposite ends in bearings 419 and 421 formed in the machine housing 20. A threaded portion 422, formed along the end portion of the shaft 418 adjacent the bearing 421, is adapted to receive an internally threaded elongate flanged sleeve 423. A threaded reduced end portion 424, of the shaft 418, is provided with a pair of lock nuts 426 for rigidly securing the sleeve 423 in any predetermined position upon the threaded portion 422. A slot 427, formed in an upper portion of the block 401, slidably receives a vertically disposed rack block 428 which is supported in a groove formed in an upper portion of the shaft 418.

The block 428 is provided with a notch 429 for receiving a collar 431 which is rigidly mounted upon the shaft 418.

When the cams 394 and 396 upon the rotating drum 392 engage the follower 398, the block 401 is moved alternately in opposite directions upon the rails 404 and 406. The opposite ends of the block 401 alternately approach the flanged sleeve 423 and the collar 431, both of which are secured upon the shaft 418. However, if the difference between the length of the block 401, and the distance between the ring 431 and the end of the flange 423 is equal to the movement imparted to the follower 398 by the cams 394 and 396, the shaft 418 and the rack block 428 will not be actuated. By adjusting the flange 423 toward the collar 431, the shaft 418 and the block 428 may be moved any desired distance, not exceeding the total distance traversed by the block 401.

A gear wheel 432, mounted on the end of a shaft 433, and meshing with the rack 428, is alternately rotated in opposite directions by movements imparted to the rack by the block 401. The shaft 433 is journaled, adjacent one end thereof, in a bearing 434 (Fig. 3) secured beneath the upper portion of the housing 20, and at the opposite end thereof in a bearing 436, formed integrally with respect to a side portion of the housing 20. An extensible shaft 437, provided with universal joints 438 and 439 (Fig. 1) at opposite ends thereof, connects the end of the shaft 433, beyond the bearing 436, to a short shaft 441.

A gear casing 442 (Fig. 14) provided with a bearing 443, rotatably supporting the shaft 441, in turn is supported by a bracket 444 (Figs. 1 and 2) which is bolted, as indicated at 446, to the ends of a pair of parallel rails 448. A cross-head 449, formed integrally with respect to the rails 448, is supported by, and rigidly secured to the arcuate plate 79. Bars 451, secured to a lower portion of the housing 77, slidably engage the lower edges of rails 448 and maintain the latter within guideways formed in a lower portion of the housing 77.

A gear wheel 452, rigidly mounted upon the shaft 441 within the casing 442, meshes with a gear wheel 453, which is rigidly mounted on a sleeve 455. A bearing 454 formed in the gear housing 442 rotatably supports the sleeve 455 that is mounted and functions in the same manner as the sleeves 157 and 350 illustrated in Figs. 14 and 17. A hub 456, of a hand wheel 457, surrounding the sleeve 455, is adapted to be clamped thereto by the manipulation of a hand lever 458, that is threaded upon the end of a pin 459 extending through a portion of the hub 456. The end of a shaft 461, rigidly secured in the hub 456 of the hand wheel 457, is journaled in the sleeve 455, while the remaining portion of the shaft extending beyond the sleeve is threaded, as indicated at 462 (Fig. 17), and extends through a threaded opening in a boss 463 formed in a lower portion of the housing 77 between the rails 448. Lock nuts 464, positioned on the threaded portion 462 of the shaft 461, are adapted to limit the movement of the carriage 78 on the rails 448. When the hand lever 458 is so manipulated as to permit relative movement between the hub 456 and the sleeve 455, rotation of the hand wheel 457, and consequently rotation of the shaft 461 will result in movement of the carriage 78 upon the rails 448. However, when the hub 456 and the sleeve 455 therein are secured rigidly with respect to each other, the carriage 78 will be moved in response to the rotation of the shaft 441.

By referring to Fig. 25, it will be observed that the follower 398, after being engaged by the cam 394, remains stationary for a substantial interval before it is engaged by the cam 396. A cam 466 (Figs. 4 and 6) secured at one edge of the drum 392 is so positioned with respect to the cams thereon as to engage a roller 467, immediately after the follower 398 has engaged the cam 394. This roller is mounted on a pin 468, secured in the upper end of an arm 469, pivotally secured adjacent its lower end on a pin 470 that is secured in a bracket 472 supported by the standard 388. A link 471, secured at one end on the pin 468, adjacent the arm 469, connects the latter to a pin 472, secured in the upper end of an arm 473. The lower end of the arm 473 is rigidly mounted upon one end of a shaft 474 journaled adjacent its opposite ends in spaced bearings 476 and 477 (Fig. 5) mounted on the base plate 21. A horizontally disposed arm 478, rigidly mounted on the opposite end of the shaft 474, is provided with an eye 479, formed intermediate the ends thereof, which is adapted to receive a circular end portion 480 of a short sleeve 481. A squared end 483 of the sleeve 481, extending laterally from within the eye 479 is slidably mounted in an elongate vertically disposed opening 484 formed in the side of an elongate block 486. A pin 482, journaled in the sleeve 481, has an annular recess 485 formed adjacent the outer end thereof which is adapted to receive an intermediate portion of a pin 490 secured rigidly in the sleeve 481. Beyond the square portion 483 the pin 482 is secured in the lower end of a detent 487 slidably disposed in a vertical opening formed in the block 486. A coil spring 488, tending to maintain the detent 487 in an elevated position is arranged between the lower end of the latter and a plug 489 threaded into the lower end of the block 486. The block 486 is secured on the lower side of a differential housing 492 provided with an opening 493 through which a tapered portion 494, formed at the upper end of the pin 487, extends. When the roller 467 is actuated by the cam 466 the detent 487, within the block 486, is moved downwardly against the spring 488, by the operation of the aforesaid link and lever mechanism connected therewith.

The shaft 34 (Figs. 3 and 6), which is driven by the gear wheel 33, extends beyond the worm 37 and is rotatably supported in a bearing 496 formed in an end plate 497 of the differential housing 492. A thrust ring 498, rigidly secured on the shaft 34 adjacent the bearing 496, prevents longitudinal movement of the shaft in the direction of the end plate 497. A spiral gear 499, mounted on the end of the shaft 34 beyond the bearing 496, meshes with a spiral gear 501 that is rigidly mounted upon a shaft 502. Journal bearings 503, formed in opposite sides of the differential housing 492 support the opposite ends of the shaft 502.

A spur gear 504, rigidly mounted on the shaft 502 adjacent the gear 501, meshes with a ring gear 506, bolted, as indicated at 507, to a flange 508 extending from the periphery of a section 509 of a gear cage 511. A sleeve 512, formed integrally with respect to the section 509, is journaled in a bearing 513, that is bolted as indicated at 514, to a lower portion of the differential housing 492. A bushing 516, arranged internally of the sleeve 512, rotatably receives one end of a shaft 517, which is journaled adjacent its opposite end in a bearing 518, bolted, as indicated at 519, to the housing 492. A pulley 521, secured by a nut 522, on a portion of the shaft 517 extending beyond the bearing 518, is adapted to be engaged by a brake band 523 (Figs. 6 and 7), secured at one end to a rod 524 extending through an opening in a lug 526 that projects from the housing 20.

Lock nuts 527, threaded upon the end of the rod 524, engage one end of a spring 528, surrounding the rod, the opposite end of which engages the lug 526. A pin 529 secures the opposite end of the band 523 to the forked end of a rod 531, the opposite end of which is secured in a lug 532 formed at one side of a bar 533. A pin 534 pivotally connects the opposite end of the bar 533 to a bracket 536 (Figs. 3 and 6), that is rigidly secured to the housing 20. A roller 537 is rotatably mounted on a pin 538 secured in an intermediate portion of the bar 533. The spring 528 exerts a tensioning force on the band 523 by reason of which the roller 537 is urged against the peripheral surface of a disc 539 rigidly mounted on the end of the shaft 379. A cam 541, secured on the outer surface of the disc 539, is adapted to engage the roller 537 at each revolution of the shaft 379. Consequently the end of the arm 533, secured to the rod 531, is moved downwardly when the cam engages the roller thus increasing the frictional force exerted by the brake band 523 to arrest the rotation of the pulley 521.

A bevel gear 542, rigidly mounted on the shaft 517 within the cage 511, meshes with a plurality of planetary bevel gears 543, each gear being mounted upon a pin 544 secured radially within the cage 511. A section 546, of the cage 511, bolted as indicated at 547, to the section 509, is provided with a sleeve 548, which is rotatably mounted in a bearing 549, bolted as indicated at 551, to the housing 492. A bushing 552, secured in the sleeve 548, rotatably supports one end portion of a shaft 553, that has a bevel gear 554 rigidly mounted upon the end thereof extending into the cage 511. This gear also meshes with the planetary gears 543. An adjacent portion of the shaft 553 is rotatably mounted in a bearing 556, bolted, as indicated at 557, to the housing 492. A circular disc 558, rigidly secured on the shaft 553 between the bearings 549 and 556, is provided with a tapered opening 559 (Fig. 5) which is adapted to receive the tapered end 494 of the detent 487.

The rotation of the shaft 34 is transmitted by the spiral gears 499 and 501, the shaft 502, and the gear 504, to the ring gear 506, thus bodily rotating the gears 543 in a circular path about the axis of the shafts 517 and 553. When the detent 487 engages the opening 559 in the disc 558, rotation of the gear 554 with the gears 543 positively is prevented. Consequently, the gear 542 is rotated by the pinions 543, against the slight friction normally exerted by the brake band 523 upon the pulley 521. The cam 466 on the drum 392, and the cam 541 on the disc 539, are so positioned with respect to each other that the latter cam engages the roller 537, thus increasing the frictional force exerted by the band 523 on the pulley 521, when the first cam 466 engages the roller 467 and initiates the removal of the detent 487 from the opening 559. The increased amount of friction exerted by the band 523 on the pulley 521 during such periods suffices to prevent the rotation of the gear 542 by the gears 543, and consequently, the shaft 553, together with the disc 558, is rotated by the gear 554. When the cam 466 disengages the roller 467, the spring 488 urges the detent 487 against the rotating disc 558. When the opening 559 reaches a position opposite the detent 487, the spring 488 projects the tapered portion 494 of the latter into the opening 559 and further rotation of the disc thus positively is prevented.

Immediately after the beginning of the aforesaid rotative movement of the disc 558, the cam 541 on the disc 539 passes beyond the roller 537 and the friction between the band 523 and the pulley 521 thereupon is reduced. Consequently, when the tapered end 494 of the detent 487 engages the opening 559 in the disc 558, rotation of the gear 542, the shaft 517 and the pulley 521 again is initiated.

As best shown by Figs. 3 and 11, a portion of the shaft 553, extending beyond the bearing 556, is journaled in a bearing 566 formed in the rear wall of a gear box 565, that is similar in construction and function to the gear box 42, and is secured to a portion of the housing 20 (Figs. 3 and 11). A bracket 567, mounted on the shaft 553 beyond the bearing 566, is provided with a slot 568 adapted to receive slidably the head of a bolt 569. A pair of gears 571 and 572 (Figs. 3, 9 and 11) having pins 573 extending within oppositely disposed openings formed in the gears, are rotatably mounted on a sleeve 574 surrounding the bolt 569 and are clamped against the side of the bracket 567 by a nut 576. A pair of spaced arcuately formed arms 577, having centers of curvature at the axis of the shaft 553, are adapted to be clamped by a bolt 578 against a boss 579 formed in an adjacent portion of the box 565. A gear 581, meshing with the gear 572, is rigidly secured upon a square hub 582 journaled on the shaft 553 and provided with lugs 583 that extend within oppositely disposed openings formed in a collar 584. The latter is keyed, as indicated at 590, on the end of the shaft adjacent the hub. The inner ends of a pair of spaced transverse openings 586 and 587, formed in the collar 584, are selectively engaged by a ball 588, resiliently mounted on a spring 589, that is situated in a transverse opening 591, formed adjacent the end of the shaft 553.

When the collar 584 is so moved longitudinally of the shaft 553 that the ball 588 is seated in the opening 586, the lugs 583 engage the openings in the collar 584 and the gear 581 is rotatable with the shaft 553. However, when the collar 584 is not engaged by the lugs 583, the gear 581 is rotatable independently of the shaft 553.

A crank 592 (Figs. 12 and 13) for rotating the gear 581 is provided with a square opening 593, adjacent the end thereof, for engaging the hub 582, and a round opening 594, extending there beyond for receiving the collar 584. When the collar 584 is disengaged from the hub 582, the crank 592 may be operatively associated with the hub and the gear 581 rotated with respect to the shaft 553. However, during the normal operation of the machine the gear 581 and the shaft 553 rotates as a unit.

A shaft 596, rotatably mounted in a bearing 597 formed in the box 565, has a gear 598 rigidly securely on the end thereof, which meshes with the gear 571. A worm casing 599 (Fig. 3) rigidly secured within the housing 20, surrounds a worm 601 which is rigidly secured upon a portion of the shaft 596, the latter being journaled at opposite ends of the worm in the casing 599. A worm wheel 602, rotatably driven by the worm 601, is rigidly mounted on the lower end of a vertically disposed shaft 603. A bearing 604, (Fig. 9) projecting above the housing 20, is provided with an internally tapering bushing 606 which rotatably supports a tapering portion 607 of the shaft 603 above the worm wheel 602. A ring 608, secured by pins 609 to an upper portion of the bearing 604, extends into an annular recess 611 formed in the lower end of a hub 612, of a circular table 613, rigidly secured at its center, by a threaded ring 614, to an upper end portion 616 of the shaft 603. An annular rail 617, formed on the lower portion of the table 613, slidably engages an oppositely disposed annular guide way 618 which is formed between the upper edges of a pair of spaced webs 619 formed integrally with respect to an upper portion of the housing 20.

When the detent 487 is removed from the opening 559 and the disc 558 is rotated 360 degrees, the worm 601 engaging the worm wheel 602 rotates the table 613 about its shaft 603 upon the guideway 618. The number of degrees of rotation imparted to the table 613 by a single revolution of the disc 558 is varied by changing the ratio of the gears 571, 572, 581 and 598 associated with the shafts 553 and 596.

The end of the arm 478, beyond the eye 479, is provided with an elongate opening 621 (Fig. 4) for receiving a pin 622 which is secured between bifurcated ends 623 formed on a lower portion of a valve actuating rod 624. A piston 626, formed intermediate the ends of the rod 624, slidably engages a valve casing 627, supported by bracket 628, secured to the base plate 21, by bolts 629. Conduits 631 and 632 communicate with the interior of the valve casing 627 at diametrically opposite points on the circumference thereof. Conduits 633 and 634, equally spaced from and parallel to the conduits 631 and 632, also communicate with the interior of the casing 627. Parallel openings 636 and 637, formed on the piston 626, are spaced by a distance equal to one and one half times the distance between the pairs of conduits 631—632 and 633—634. When the piston 626 reaches its upper limit, the opening 637 registers with the conduit 633 and 634. Likewise when the piston 626 reaches its lower limit the opening 636 registers with the conduits 631 and 632.

A similarly disposed pair of angular openings 638 and 641, formed in the piston 626 between the openings 636 and 637, alternately provide communication between the conduits 631 and 633, and openings 639 and 642, formed in the casing 627, which openings communicate with the atmosphere. The conduits 632 and 634 are connected to a conduit 643 that communicates with an air compressor (not shown). The conduit 633 communicates with the interior of a cylinder 644 (Fig. 10) at one end adjacent the head 646 thereof, while the conduit 631 communicates with the opposite end thereof. An arcuate stirrup 667, the ends of which are bolted, as indicated at 648, to the machine housing 20 support the cylinder 644.

A piston 649, rigidly secured by nuts 652, upon one end of a piston rod 651 slidably engages the interior of the cylinder 644. An elongate chambered extension 653 formed at the end of the cylinder 644 opposite the head 646 is provided with a head 654, bolted to the end of the extension, as indicated at 656. A stirrup 657 bolted to the machine housing 20, as indicated at 658, rigidly supports the extension 653. A bolt 661, screw-threaded into the end of the piston rod 651 projecting toward the extension 653, is provided with a head 662 which abuts the end of a rack 663 slidably mounted on the bolt 661. The length of the bolt 661 is greater than the length of the rack 663, thus providing a lost motion period between the movements of the piston 649 and the rack 663.

A gear housing 664, communicating with the interior of the extension 653, is bolted as indicated at 666 to an upper portion of the latter. This housing encloses a gear 667 that is rigidly mounted on a shaft 673 and meshes with the rack 663. Bushings 668 and 669, mounted in bearings 671 and 672 formed at opposite sides of the housing 664, rotatably support the shaft 673. The end of the housing 664 adjacent the bearing 672 is closed by an end plate 674, bolted, as indicated at 676, to the housing, while the opposite end thereof is closed by a packing gland 677 adjustably secured by bolts 678, to the end of the bearing 671.

An end of the shaft 673, extending from the housing 664 through the gland 677, is provided with oppositely threaded portions 679 and 681 screwed into sleeves 682 and 683, respectively. Oppositely disposed flanged portions 684 and 686 formed on the ends of sleeves 682 and 683, respectively, are adapted to seat against tapering bushings 687 and 688 secured upon rings 689 and 691, by pins 692 extending through the bushings and the rings. Also, the opposite extremities of eyes 693 and 694, surrounding the shaft 673, are secured by the pins to the rings 689 and 691. Oppositely disposed arcuate arms 696 and 697, having the eyes 693 and 694 formed at adjacent ends thereof, are pivotally mounted on a bolt 698 which is rigidly secured in an adjacent portion of the machine housing 20. Oppositely tapering annular surfaces 699 and 701 (Fig. 9) formed on the inner surfaces of arms 696 and 697 are adapted to seat against complementary tapering surfaces formed on the lower portion of the hub 612 of the table 613 and the upper portion of the bearing 604, respectively.

When the piston 626 is so positioned within the casing 627 as to connect the end of the cylinder 644 adjacent the head 646, to the conduit 643 through the conduit 633 and the opposite end of the cylinder to the opening 639, the piston 649 will be urged away from the head 646. Consequently, the tapering surfaces 699 and 701 of the arms 696 and 697 will be urged into engagement with the hub 612 and the bearing 604. The table 613, thus, is rigidly secured with respect to the housing 20 and slight movements or chattering of the table 613 positively is prevented. When the piston 626 is so positioned as to supply fluid to the opposite end of the cylinder 644, the arms 696 and 697 are disengaged from the hub 612, and the bearing 604, thus permitting the table 613 to be rotated during the interval while the detent 487 is displaced from the opening 559 in the disc 558.

Radial recesses 706, formed in the upper surface of the table 613, are adapted to receive heads 707 of bolts 708 which extend through openings formed in a flange 711 of a ring 712, the latter being secured upon the upper surface of the table by nuts 709 engaging the bolts. A mold blank 704 is supported, by the ring 712, upon an annular shoulder 703, formed on a lower portion of the mold which rests upon the upper edge of the ring. The ends of the bolts 708, above the ring 712, extend through openings formed in a flange 713 of the mold 704 and are engaged by nuts 705 which secure the mold 704 against rotative movement with respect to the ring 712. A semi-toroidal surface 714, similar to a longitudinal section of a tire casing, is formed in the mold blank 704, the latter being so positioned with respect to the table 613 that the surface 714 is concentric with respect to the table.

In order to engrave a perfect design in the surface 714, it is necessary that every portion of the mold 704 be rotated in a plane perpendicular to the axis of rotation of the table 613. Accordingly, an indicating instrument 716 (Fig. 21) is so mounted upon the machine as to enable an attendant, by observation of the instrument, to place shims between the ring 712 and the table 613 for correcting the variations indicated by the instrument. A horizontally disposed pin 718, supporting the instrument, is secured in an opening formed in a vertically disposed block 717. An arm 719, having an eye 721 formed at one end thereof rotatably supporting the block 717, is pivotally mounted on a bearing 722 formed at its opposite end which is journaled on a pin 723 rigidly secured by a nut 724 to the frame 194. An end plate 726 bolted, as indicated at 727, to the upper end of the block 717, engages the upper end of the bearing 721 while the opposite end of the latter abuts a flange 729 formed on the block beneath the bearing. A coil spring 731 arranged within an opening formed longitudinally in an upper portion of the block 717 is compressed between the plate 726 and a head 732 formed on the upper end of a pin 733 that is slidably mounted in a smaller opening formed in a lower portion of the block 719.

A set screw 734, provided with a lock nut 736, is threaded into an opening formed in the block 717 which opening intersects the opening in which the pin 733 is mounted. The set screw is adapted to be tightened against the pin for maintaining it in an elevated position when the instrument is not in use. A laterally disposed curved arm 738 is secured at one end, by a bolt 737, to the lower end of the pin 733, while the opposite end of the arm supports a vertically disposed stem 741, movably mounted in the instrument, which stem actuates a pointer 742 for indicating readings on the latter. The head of the bolt 737 is cone shaped, as indicated at 739 and is adapted to engage an annular machined surface 740 of the mold 704 while the latter is rotated manually by the crank 594, as hereinbefore described.

In order to provide means for measuring the distance between the end of the engraving tool 232 and the center of oscillation of the head 217, a screw 744 (Fig. 18) having an enlarged head 746 is threaded into the end of one of the trunnions 218. A slot 747, formed diametrically in the head 746, slidably receives a scale 748, having an arm 749 extending normally to the scale at one end thereof. A line 751, intersecting the axis of the tool head 217 and the scale 748, is formed on the outer surface of the head 746 of the screw 744. When adjusting the position of the end of the tool 232, the scale 748, is moved within the slot 747 until a predetermined reading is indicated on the scale at the line 751. Then the sleeve 222 is rotated within the tool head 217 until the end of the tool 232 engages the arm 749.

When only a portion of a character is located in a mold section, it may be desirable, at intervals, to permit the idle rotation of the engraving tool rather than to replace, temporarily, any of the cams on the drums 107 or 324. During such intervals the speed of the machine may be increased automatically thus quickly returning the tool and reducing the period of idle operation of the machine. For this purpose, a plurality of cams 750, 752, 753 and 755 (Figs. 20 and 23) are secured on the drum 107, which cams are adapted successively to engage a roller 754 for actuating a mechanism that alternately increases or decreases the speed of operation of the machine. The roller 754 is journaled in an intermediate portion of an arm 756 that is pivotally mounted at one end on a pin 757 secured to the housing 77. A rod 758, secured to the opposite end of the arm 756 by nuts 759, connects the arm to the end of a bell crank lever 762, having a bolt 761 mounted therein on which the rod is secured. The lever is journaled on a pin 763 rigidly secured in the housing 77. A pawl 764, pivotally mounted on a pin 766, secured in an opening in the bell crank lever 762, engages a ratchet wheel 767 which is journaled on the pin 763 adjacent the bell crank lever 762. A disc 768, having cam lugs 769 spaced around the periphery thereof, also is journaled on the pin 763 and is rigidly secured to the ratchet wheel 767. When the roller 754 is engaged by the cams 750, 752, 753 and 755, the pawl 764 on the bell crank lever 762 rotates the ratchet wheel 767 and the disc 768, a distance equal to one half the distance between corresponding portions of the cam lugs 769. A roller 771, adapted to be engaged by the cam lugs 769, is rotatably mounted on a pin 772 secured in the end of an arm 773 which controls the operation of a switch 774. When, for example, the cam 750 engages the roller 754, the roller 771 is engaged by the end of one of the cam lugs 769, and an electrical circuit through the switch 774 thus is closed. When the cam 752 engages the roller 754, the disc 768 is so moved that the roller 771 engages the disc between two of the cams 769 and consequently the circuit through the switch 774 is opened.

A two-voltage power line 778 (Fig. 22) employed for energizing the electrical units of the machine, is composed of conductors 779, 781 and 782, the voltage between the conductors 779 and 782 being substantially twice as great as the voltage between the conductors 781 and 782. The terminals of the motor 278 are connected to the conductors 781 and 782 by conductors 783 and 784, the latter being provided with a contact switch 786 for controlling the circuit therethrough. A double pole relay switch 787, having closing elements 788 and 789 controlled by a solenoid 791, composed of a coil 792 and a core 793, is so arranged in the conductors 779 and 781 as to close alternately a circuit in the conductors through the elements 788 and 789, respectively.

A manually operable contact switch 794 is connected in series with the switch 774, and the coil 792 of the solenoid 791, by conductors 796, 797 and 798, which are so arranged as to provide a shunt circuit between the conductors 781 and 782. Beyond the relay switch 787, the conductors 779 and 781 are connected to one of the terminals of the motor 24, while the remaining terminal thereof is connected to the conductor 782. A switch 799, in the conductor 782, provides means for closing a circuit through the motor 24. Under normal conditions, the circuit through the switch 794 is open and consequently the circuit through the element 789 and the conductor 781, to the motor 24, is closed. This being the low voltage circuit of the power line 788, the motor 24 is driven at a relatively low speed.

When it is desirable to operate the motor 24 at alternating speeds, the switch 794 is closed manually. Thus, when the roller 771 is engaged by the end of one of the cams 769, a circuit is closed through the switch 774 and consequently the coil 792 of the solenoid 791 is energized. Thereupon, the circuit through the element 789, and the conductor 781, to the motor 24, is broken while another circuit is closed, by the element 788, through the conductor 779. Thereafter, the motor 24 is driven at a relatively high speed until the disc 768 again is rotated and the circuit is broken through the switch 774. Since the disc 768 continues to rotate intermittently, whenever one of the cams 750, 752, 753 or 755 engages the pin 754, the voltage affecting the motor, accordingly, is changed intermittently.

According to this embodiment of the invention, the machine is adapted to engrave a plurality of diamond shape characters 801 (Fig. 26) upon a portion of the surface 714 of the tire mold 704. The drums 107, 324, and 392 all are adapted to rotate at equal angular speeds. One of the diamonds 801 is engraved and the mold 704 rotated into a position for cutting a second diamond for every single revolution of the drums 107, 324 and 392. The cams 394 and 396 are so positioned on the surface of the drum 392 as to be engaged by the follower 398 immediately after the followers 333 and 117 have passed beyond the cams 114 and 332 on the drums 107 and 324 and before they engage the cams 108 and 326 of the drums, respectively.

In the operation of the machine, the cam 296 on the drum 392 engages the follower 398 thus moving the carriage 78 on the guide rails 443 in a direction away from the mold 704 and the rotatable table 613. The engraving tool 232 thus is urged into the mold 704 at the center of the diamond 801 in a position as indicated at "0". Immediately thereafter, the cam 326 on the drum 324 engages the follower 333 and the carriage 78 is so moved on the rails 82 as to engrave a recess in the surface of the mold between the positions indicated at "0" and "1" (Fig. 26). Thereafter the cams 108, 109, 111, 112, 113 and 114 on the drum 107 and the cams 327, 328, 329, 331 and 332 on the drum 334 successively engage the followers 117 and 333 respectively in the order indicated by the numerals "0"—"10" in Figs. 23 and 24. The corresponding positions of the tool 232, within the diamond 801, are indicated by similar numerals in Fig. 26. While the tool is being returned by the cam 114 of the drum 107, from the position designated "10" to the position designated "0", the cam 394 engages the follower 398 and the tool 232 is withdrawn beyond the inner surface of the mold. Thereafter, the cam 466 engages the roller 467 and permits the operation of the index mechanism, as hereinbefore described, thus rotating the table 613 with respect to the tool 232 into a position for engraving a succeeding diamond. When the cam 396 again engages the follower 398, the series of operations previously described, automatically, is repeated.

After a complete series of diamonds 801 has been engraved about the inner surface of the 228 is changed, while the follower 117 is midway mold 704, the angle of inclination of the spindle 228 is changed, while the follower 117 is midway between its opposite limits of travel, by loosening the hand lever 168 and rotating the hand wheel 164 with respect to the sleeve 157. When the proper reading is indicated on the scale 165, the wheel and the sleeve again are rigidly secured together by manipulation of the lever 168.

It is to be understood that practically any design may be engraved upon the surface of a mold merely by the substitution of differently formed cams on the drums 107 and 324.

From the foregoing description, it is apparent that the invention provides a machine capable of relatively continuous and automatic operation. The cost of production of molds by this machine is substantially decreased as compared with the cost of production of molds by the machines employed heretofore. It is apparent, also, that the spacing of the characters of the design will not vary appreciably and that other possible causes of imperfections are greatly minimized.

Although I have illustrated only the preferred form which the invention may assume and have described that form in detail, it will be apparent to those skilled in the art that it is not so limited but that various modifications may be made therein without departing from the spirit of the invention or from the scope of the appended claims.

What I claim is:

1. An engraving machine comprising a frame, a mold supporting table rotatably mounted on the frame, an engraving tool carriage movable upon the frame about the center of rotation of the table but supported on the frame outside the table, and means for moving the table and the carriage alternately during a single mold unit cutting operation.

2. An engraving machine including a frame, a mold supporting table rotatably mounted on the frame, a plate slidably secured to the frame outside the table for arcuate movement about the axis of the table, a carriage slidably secured to the axis of the table, a carriage slidably secured to the plate for radial movement with respect to the axis of the table, means for controlling the movement of the plate, means for controlling the position of the carriage on the plate, and engraving means on the carriage.

3. A mold engraving machine including a frame, a mold supporting table rotatably mounted on the frame, a plate slidably secured to the frame for arcuate movement about the axis of the mold table, a carriage slidably secured to the plate for movement radially of the mold table, engraving means carried by the carriage and means for automatically moving the plate, the carriage and the table in synchronized relation to engrave a mold supported on the table.

4. A mold engraving machine including a frame, a table rotatably mounted on the frame and adapted to support a mold, an engraving tool, means for rotatably supporting the tool, means for rotating the tool, means for moving the tool supporting means radially of the mold table, means for moving the tool supporting means circumferentially of the mold table, means for moving the tool vertically of the mold table, means for pivotally moving the tool in a plane perpendicular to the mold table, and means interconnecting all of the moving means to synchronize the operations thereof.

5. A mold engraving machine including a frame, a table rotatably mounted on the frame and adapted to support a mold, an engraving tool, means for rotatably supporting the tool, means for rotating the tool, means for moving the tool supporting means radially of the mold table, means for moving the tool supporting means circumferentially of the mold table, means for moving the table vertically of the mold table, and means for pivotally moving the tool in a plane perpendicular to the mold table.

6. A mold engraving machine including a mold-supporting table, a differential mechanism having a rotatable casing and oppositely extending shafts, one of the shafts being connected to rotate the table, braking means adapted to releasably stop the rotation of the other shaft, means to continuously rotate the differential casing, means for normally locking the first named shaft against movement, means to simultaneously unlock the first named shaft and brake the second shaft at periodic intervals, whereby the table is rotated.

7. In a mold engraving machine, a frame, a mold supporting table rotatably mounted on the frame, a carriage slidably supported on the frame outside the mold table, means for moving the carriage radially and circumferentially of the mold table, a vertically adjustable bracket on the carriage extending over the mold table, a tool spindle pivotally carried on the bracket and means on the carriage operatively connected with the tool spindle to pivotally move the spindle.

8. In a mold engraving machine, a mold supporting table, a bracket, means supporting the bracket over the table, a tool spindle, a housing for the spindle, the housing being pivotally secured on the bracket on an axis extending transversely of the spindle, a shaft, a housing for the shaft, the housing being pivotally secured on the bracket on an axis extending transversely of the shaft, a gear feathered to the shaft and carried in the shaft housing, driving means pivotally connecting the tool spindle and the shaft, and means extending through the pivotal axis of the shaft housing for rotating the gear feathered on the shaft.

9. A mold engraving machine including a rotatably mounted mold supporting table, engraving means, means adapted to move the engraving means radially, circumferentially and vertically of the mold table, means adapted to periodically index the table, means for interconnecting the movements of the table and the engraving means, means for actuating the means adapted to move the engraving means and the table indexing means, and automatic means to change the speed of the actuating means.

10. An engraving machine comprising a frame, a mold-supporting table rotatably mounted on the frame, a carriage mounted for movement about the center of the table but supported on the frame outside the table, and an engraving tool associated with the carriage for engraving the mold.

HERMAN J. HOENES.